(12) United States Patent
Castro et al.

(10) Patent No.: US 11,369,105 B2
(45) Date of Patent: Jun. 28, 2022

(54) SUPPORT FOR SPREADING BOOM OF AN AGRICULTURAL SPRAYER

(71) Applicant: BK Components S.A., Ciudad Autónoma de Buenos Aires (AR)

(72) Inventors: Ezequiel Castro, Buenos Aires (AR); Javier Mariano Bertani, Buenos Aires (AR); Ezequiel Poodts, Buenos Aires (AR); Germán Adrián Kokubu, Buenos Aires (AR)

(73) Assignee: BK Components S.A., Ciudad Autónoma de Buenos Aires (AR)

( * ) Notice: Subject to any disclaimer, the term of this patent is extended or adjusted under 35 U.S.C. 154(b) by 187 days.

(21) Appl. No.: 16/415,017

(22) Filed: May 17, 2019

(65) Prior Publication Data

US 2019/0357519 A1 Nov. 28, 2019

Related U.S. Application Data

(60) Provisional application No. 62/674,756, filed on May 22, 2018.

(51) Int. Cl.
*A01M 7/00* (2006.01)
*B05B 1/20* (2006.01)
*A01C 23/04* (2006.01)
*B05B 15/62* (2018.01)

(52) U.S. Cl.
CPC ......... *A01M 7/0075* (2013.01); *A01C 23/047* (2013.01); *A01M 7/0053* (2013.01); *B05B 1/20* (2013.01); *B05B 15/62* (2018.02)

(58) Field of Classification Search
CPC ... A01M 7/0075; A01M 7/0053; B05B 15/62; B05B 1/20; A01C 23/047
USPC .................. 239/163, 164, 166–168, 172, 176
See application file for complete search history.

(56) References Cited

U.S. PATENT DOCUMENTS

| D753,729 S | 4/2016 | Ponzinibbio |
| 10,085,437 B2 | 10/2018 | Mariani et al. |
| 2017/0000103 A1* | 1/2017 | Wissler ............... A01M 7/0071 |

* cited by examiner

*Primary Examiner* — Christopher S Kim
(74) *Attorney, Agent, or Firm* — Knobbe Martens Olson & Bear, LLP

(57) ABSTRACT

Spraying boom support for agricultural sprayers, whether trailed, self-propelled and/or airborne, which includes identical articulated arms arranged on either side of the sprayer. Said arms are extended transversely to the direction of advance of the sprayer, and are coupled in an articulated manner to a central support section of the chassis of said sprayer. Each articulated arm is comprised of bar sections formed by a composite material consisting of a reinforcing agent selected from carbon fiber, fiberglass, aramid fiber, boron fiber or a combination thereof, and a matrix of epoxy, vinyl ester, phenolic, polyester resins or thermoplastic material. At its ends, the bar sections have metal nodes that make up the joints and links, also fulfilling the role of taking the concentrated loads of them and distribute them in the bar sections of composite material. In this way areas of great thickness of composite material are avoided and the advantages of each material are exploited resulting in an economical, efficient, lightweight, low maintenance and easily repairable design.

18 Claims, 24 Drawing Sheets

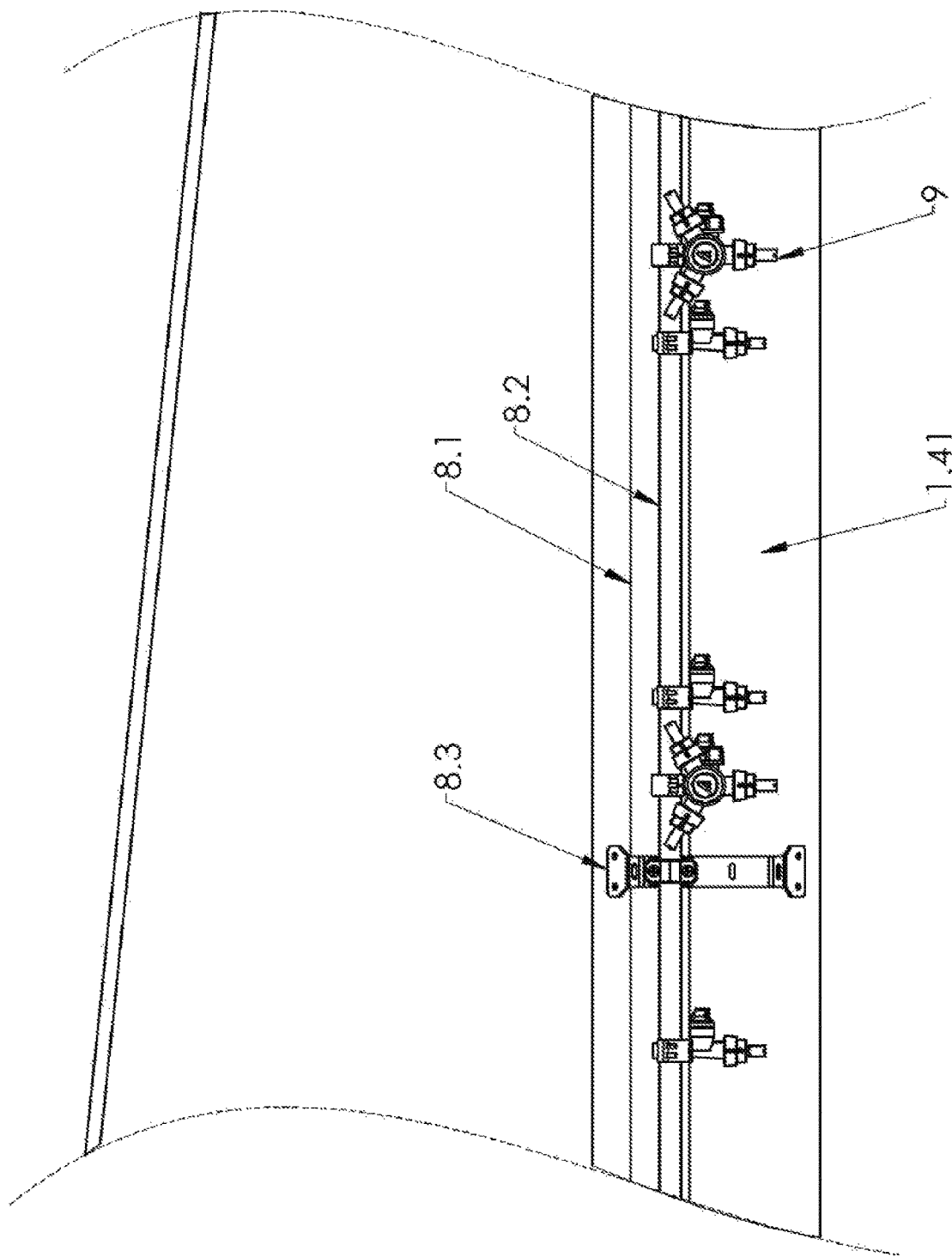

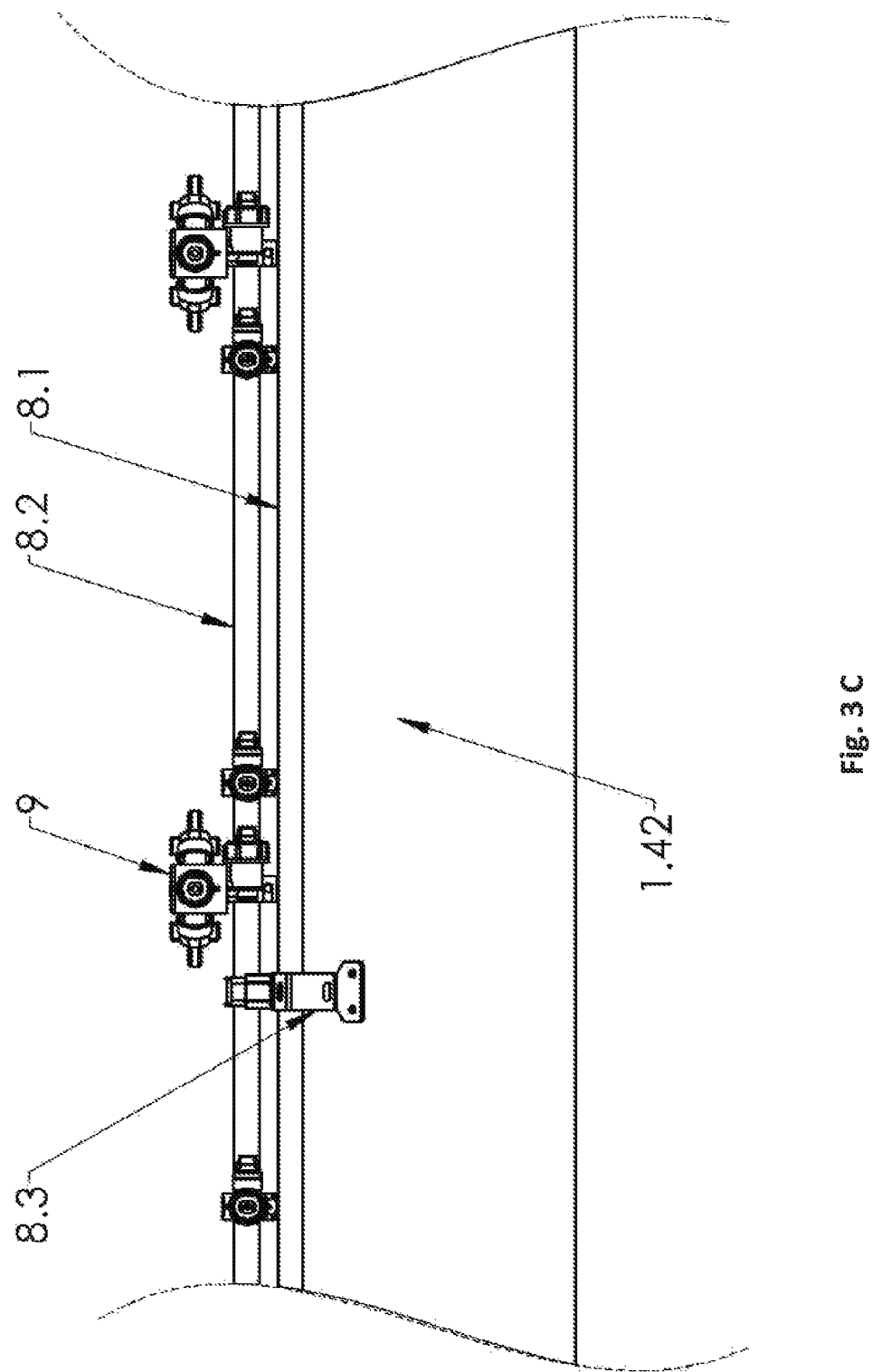

SUPPORT FOR SPREADING BOOM OF AN AGRICULTURAL SPRAYER

FIELD OF THE INVENTION

The present invention is encompassed in the field of sprayers, whether trailed, self-propelled or airborne. It particularly relates to the support structure of the spraying boom of liquid to be sprayed which is arranged on the chassis of said agricultural sprayers.

BACKGROUND OF THE INVENTION

It is known that agricultural sprayers are machines widely used to spread, in the form of small drops, a treatment product on plants; for example, phytosanitary products or pesticides that prevent the action or directly destroy the pests, as well as they can be directed to the defoliation, drying or regulation of plant growth.

For example, patent document EP 1172034, published on Jan. 16, 2002, shows an agricultural sprayer comprising a chassis that supports, on the one hand, a vat containing a treatment broth, and, on the other hand, a plurality of spray nozzles disposed at substantially regular intervals along a spraying boom.

When the work takes place, the agricultural sprayer is displaced according to a direction of advance on a field presenting plants to be treated. The spraying boom is arranged transversely to said direction of advance, on either side of a middle vertical plane of said sprayer, spraying the treatment broth on the plants to be treated.

The spraying boom is supported by a cross-linked metal structure whose lower bar supports the spray nozzles. Said cross-linked structure is advantageously cut into sections articulated to each other. Thus, when the transport takes place, said spraying boom can be folded into several parts to reduce the total width of the sprayer.

Most spraying boom supports have the disadvantage of being very heavy since they are made of metal. In fact, product of the own weight of the material with which they are manufactured, they require a cross-linked structure to be able to maintain the required horizontality of its lower bar, which supports the spray nozzles. All this metal structure has a great weight, which limits the length of the structure due to the deformations and vibrations that occur when the sprayer performs its work in the field.

The working width of the sprayer structure is limited by the specific stiffness and strength of the material; the properties of the composite material being considerably higher than those of steel or aluminum.

The cyclic efforts, along with the vibrations, produce breaks in the structure that require to take the sprayer from the field and take it to a workshop to repair the break through welding, with the consequent loss of time in the work.

The weight of the structure also influences the speed at which the sprayer can develop its work. Going very fast can lead to the breakage of the structure and the known loss of time and resources.

Also, the mass of the structure influences when turning at the head of the field. The inertia of the reticulated structure makes it difficult to turn and it is necessary to slow down and even stop to be able to drive the sprayer in the proper direction.

On the other hand, the treatment products that are sprayed are highly corrosive, which favors the deterioration of the metal with which the structure has been manufactured and favors its breakage.

For these reasons, it is required to design a spraying boom support that allows eliminating the above-mentioned drawbacks, achieving to carry out the work of treatment of the plants with greater performance and efficiency.

There is pending patent application EP 3066922 A1, with its equivalent US 20160286781 A1 which was granted under the number US 10085437 B2, national continuations of the PCT application published as WO 201506782 A1, and its respective application in Argentina under the publication number AR 095385 A1, where a boom support made of carbon fiber is presented, a much more rigid material in relation to its specific weight with respect to any metal, which is advantageous for the product for the reasons stated above. It is very important to clarify that the inventive step of the product dealt with in this specification presents evident improvements in the final product, which consists of an innovative modular concept that combines metal parts with parts of composite materials, manufactured with an automatic technology and solving several problems not only the cost of the product, but also the stability of the support in the field to be used; the substantial difference being with the aforementioned application that the arms are constituted by single-piece sections of composite material, which to be manufactured need a particular matrix (mold and counter-mold) for each section. These parts support not only the bending and axial stresses of the bar, but also the concentrated loads in the articulations for which the thicknesses of composite material in said area must be increased, with the consequent increase in the cost of the product. Even its profile allows spraying product to accumulate on the boom.

BRIEF DESCRIPTION OF THE INVENTION

The present invention is established and characterized in the independent claims, wherein the dependent claims describe more specific characteristics thereof.

In view of the foregoing, the present invention relates to a spraying boom support for agricultural sprayers, whether trailed, self-propelled and/or airborne.

The support includes two articulated arms, each constituted by at least three sections, which can be symmetrical arranged on either side of the sprayer, and can be extended transversely to its direction of advance. For this, said articulated arms are coupled in an articulated manner to a central support section of the sprayer chassis.

For its part, each articulated arm is comprised of sections of bar with tubular profile, for example of round, oval section, or other section of rounded faces, formed of a composite material (for example plastic reinforced with carbon fiber, fiberglass, etc.) made by the filament winding process (FW) or another robotic process such as automated tape placement (ATP), automated fiber placement (AFP), pultrusion or pultrusion associated with pullwinding technology and metal nodes in the areas of articulation, resulting in a modular boom, where the use of tubes allows to modify its length, adjust thicknesses and/or the sequence of the laminate only by changing the tubes without the need for complex molds; while metal nodes facilitate repair without the need to replace the entire tube, favoring the reduction of maintenance cost as well as the cost of the assembly considerably.

The tubular sections allow to gain width of work with low weight taking advantage of the high specific properties of the composite material, while the metal nodes support the concentrated loads of the articulations and distribute them in the pieces of composite material. In this way, areas of great thickness of composite material are avoided and the advantages of each material are exploited resulting in a simple, economical, efficient, lightweight, low maintenance and easily repairable design.

The conformation of the bar sections of the articulated arms with the materials and the geometric configuration previously described allows to achieve a considerable reduction of the weight of the structure of the articulated arms, as well as greater resistance to the fatigue of the material, favoring the design of a spraying boom support made up of articulated arms of greater length, that is to say, with a greater width of work.

On the other hand, by having the composite materials a better ratio of rigidity to density (specific rigidity), it is possible to maintain the horizontality of the bar sections that support the spray nozzles with a lower overall weight, thus reducing the inertia of the required structure to support the spraying boom of the sprayer.

All this allows carrying out the work in the fields with greater speed, including in the turns at the headwaters of the field, and covering more plants to be treated in each pass and less amount of fuel to be used, which translates into a greater productivity with greater performance and efficiency of the work. On the other hand, by requiring less passes of the sprayer in each field, the compaction of the soils thereof will be less.

Also, due to the material with which the sections of bar are made and their cross section that remains constant in each section along its length, it is possible, before a break, to repair easily and quickly the section of damaged bar in the own field, without having to move to a workshop that may be distant from where the work is carried out. For example, two repair kits can be counted, one for breakage in the last section of the bar whose simplicity can be applied by the operator of the sprayer itself, and another for severe breakage in the two main sections of the bar.

The breakage kit of the last section consists of pieces made of the same material, fixing them on both sides of the damaged area by means of the use of an adhesive, pins, rivets, bolts, keys or other suitable joining means, or combinations of the same.

When a severe break is suffered in any of the two main sections of the boom and being of the same section, a cut of equal length is made to the spare section of the same composite material. This standardized spare part has an external section that can be built-in with the inner section of the original sections, allowing it to be fixed and fixed by means of adhesive, pins, rivets, bolts, keys or other suitable joining means, or combinations thereof, to the two sections of the tube that would be damaged, being repaired and in the original length.

The ducts and/or spray hoses and hydraulic circuit, as well as the electrical wiring in this invention are outside said tube of composite material, avoiding the holes on the arms of composite material which decrease their structural strength, also allowing the quick change of hoses, if necessary.

Another appreciable advantage is that the articulated arms that make up the support do not corrode by contact with the highly corrosive products that are commonly used in the treatment of plants.

BRIEF DESCRIPTION OF THE FIGURES

The present specification is complemented with a set of illustrative figures of the preferred example, never limiting the invention.

DETAILED DESCRIPTION OF THE INVENTION

The present invention is a spraying boom support for agricultural sprayers, whether driven or self-propelled and/or airborne, such as drones or aircraft.

Figure 1A:
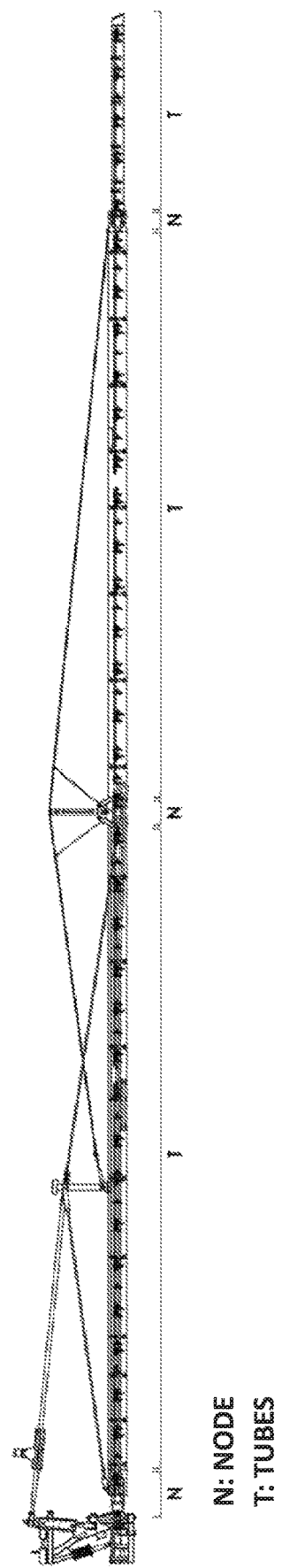
FIG. 1A shows a preferred embodiment of an articulated arm composed of sections of composite tubes and metal nodes for their connection and articulation.
Figure 1B:
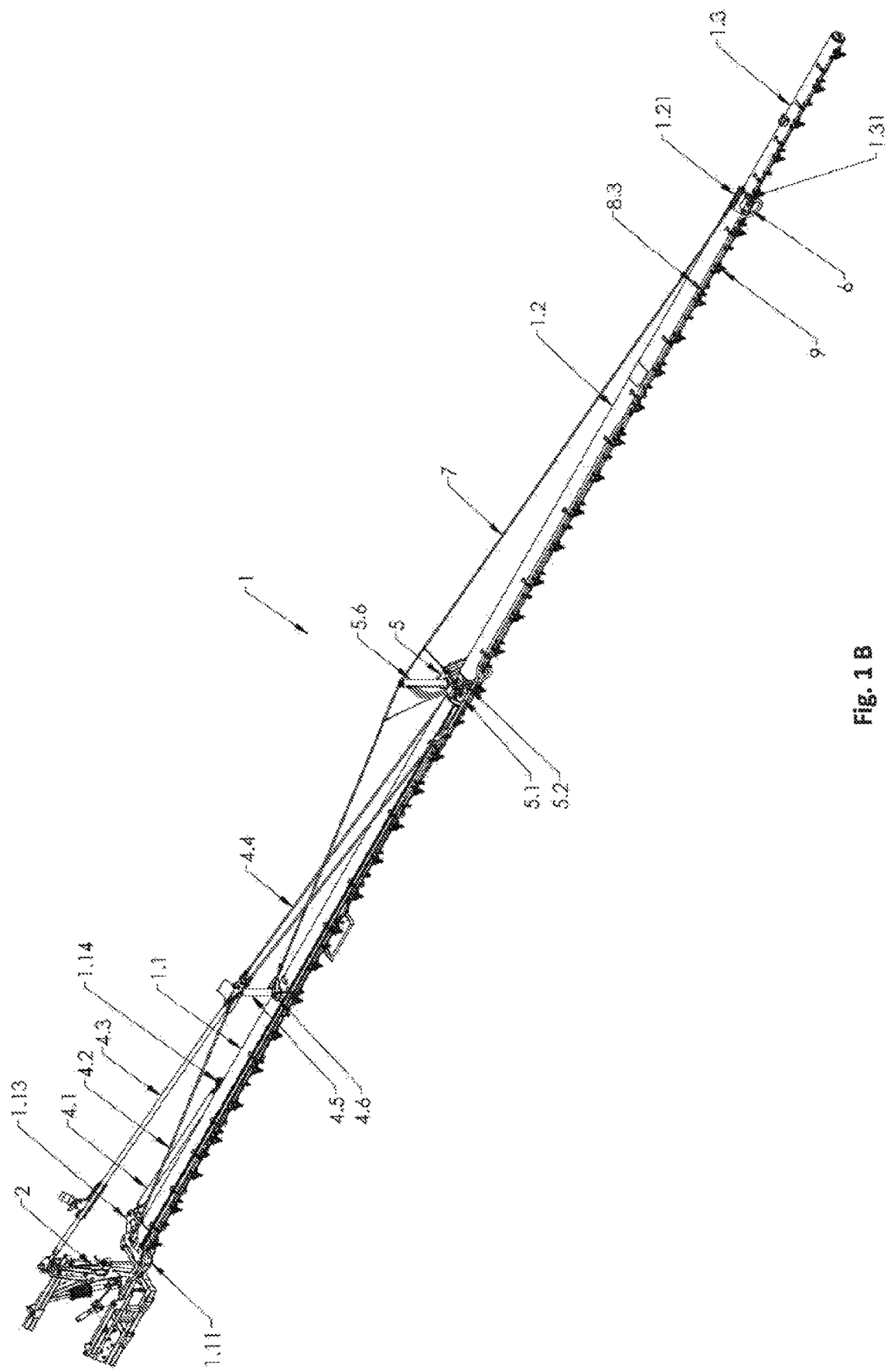
FIG. 1B represents a perspective view of one of the articulated arms that make up the spraying boom support according to a preferred embodiment of the invention, in which the numerical references of the constituent parts have been incorporated.

The support includes two articulated arms (1), as shown in FIGS. 1A, and 1B, symmetrically arranged on either side of the sprayer (not shown in the figures). Said arms (1) are extended transversely to the direction of advance of the sprayer, and are coupled in an articulated manner to a central support section (2) of the chassis of said sprayer.

As shown in FIG. 1A, each articulated arm (1) is composed of sections of composite tubes (T) and metal nodes for their connection and articulation (N).

Also, as shown in FIG. 1B, each arm comprises sections of bar (1.1, 1.2, 1.3) formed of a composite material of polymeric base (matrix), reinforced with fibers with high specific properties (reinforcement). The reinforcement can be carbon fiber, glass fiber, aramid fiber, boron fiber or a combination thereof, and the matrix may be an epoxy, vinyl ester, phenolic, polyurethane, polyester resins or any thermoplastic material useful for this purpose.

In said FIG. 1B can be seen the constituent parts of a preferred embodiment of the articulated arm (1) arranged symmetrically on both sides of the sprayer, namely: central boom support fixed to the chassis of the sprayer (2); main bar section of composite material (1.1); section of secondary bar of composite material (1.2); last section of composite material (1.3); metal flange fixed with adhesive, pins, rivets, bolts, keys or other suitable joining means, or combinations thereof, to the first end of the main bar section (1.11); metal flange fixed with adhesive, pins, rivets, bolts, keys or other suitable joining means to the second end of the secondary bar section (1.21); metal flange fixed with adhesive, pins, rivets, bolts, keys or other suitable joining means, or combinations thereof, to the first end of the last section of bar (1.31); composite material and/or metal tensioner (4.1) running from a tensioner support (1.13) of the metal flange of the first end of the main bar (1.11) to a metal support (1.14) fixed to the same section of bar (1.1), which helps to reduce the transverse movement of the boom to the advance when accelerations and decelerations take place; tensioner with adjustment to stabilize and stiffen the articulated arm (4.2); tensioner with adjustment to stabilize and stiffen the articulated arm (4.3); tensioner with adjustment to stabilize and stiffen the articulated arm (4.4); pillar with movement (4.5); pillar support flange fixed to the main bar section (4.6); articulated arm break formed by metal nodes for storage or folding (5); metal flange fixed by adhesive, pins, rivets, bolts, keys or other suitable joining means, or combinations thereof, to the second end of the main bar section (5.1); metal flange fixed to the first end of the secondary bar section (5.2); hydraulic cylinder for folding movement (5.6); slip mechanism of the last section (6); tensioning rope to stiffen the boom and ensure its folding (7); support for hose, conduits and wiring (8.3); and sprinkler spouts (9).

Figure 2:
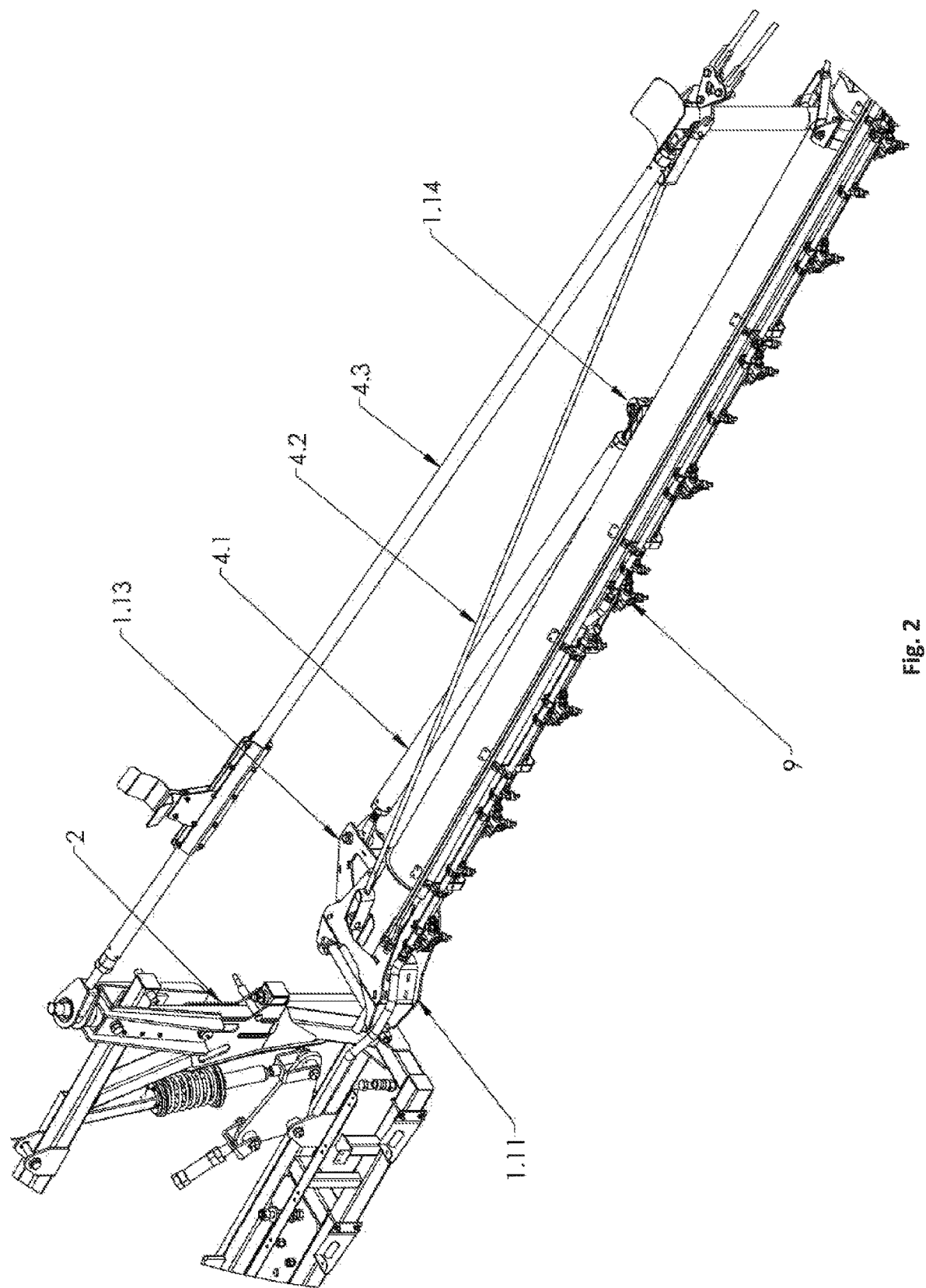
FIG. 2 shows a perspective view of the connection between the main section of the bar to the central supporting section of the boom fixed to the chassis of the sprayer.

On the other hand, FIG. 2 represents a perspective view of the connection between the main section of the bar to the central supporting section of the boom fixed to the chassis of the sprayer, showing the following component parts: central boom support (2) fixed to the sprayer chassis; metal flange of the first end of the main beam (1.11), composite and/or metal tensioner (4.1) running from a tensioner support (1.13) of the metal flange of the first end of the main beam (1.11) to a metal support (1.14) fixed to the same section of bar (1.1), which helps to decrease the transverse movement of the boom to the advance when accelerations and decelerations take place; tensioner with adjustment to stabilize and stiffen the articulated arm (4.2); tensioner with adjustment to stabilize and stiffen the articulated arm (4.3); and sprinkler spouts (9).

Meanwhile, each articulated arm is comprised of sections of bar with tubular profile, for example, round, oval section, or other section of rounded faces, formed of a composite material (for example, plastic reinforced with carbon fiber, fiberglass, etc.). The composite materials allow a low weight of each section thanks to the network of continuous fibers of high strength and specific rigidity (i.e. in relation to its density) and the plastic matrix with which they are manufactured.

Alternatively, open-frame profiles can be used to form cross-linked structures, also known as isometric grid structures (Iso-Grid) or isometric framework (Iso-Truss), which allows increasing the diameter of the tubes to achieve greater moment of inertia of the section, which improves the aerodynamic performance of the profile, leaving an open structure that lets air pass and decreasing the total weight of the profiles.

In addition, the bar sections have metal nodes at their ends that make the joints and links, and also have the role of resisting the concentrated loads of them and distribute them in the bar sections of composite material. In this way areas of great thickness of composite material are avoided and the advantages of each material are exploited resulting in an economical, efficient, lightweight, low maintenance and easily repairable design.

Particularly, the metallic junction nodes of the bar sections of the boom are manufactured in a material selected from steel, titanium, magnesium, aluminum or alloys with good resistance to concentrated loads.

Figure 3:
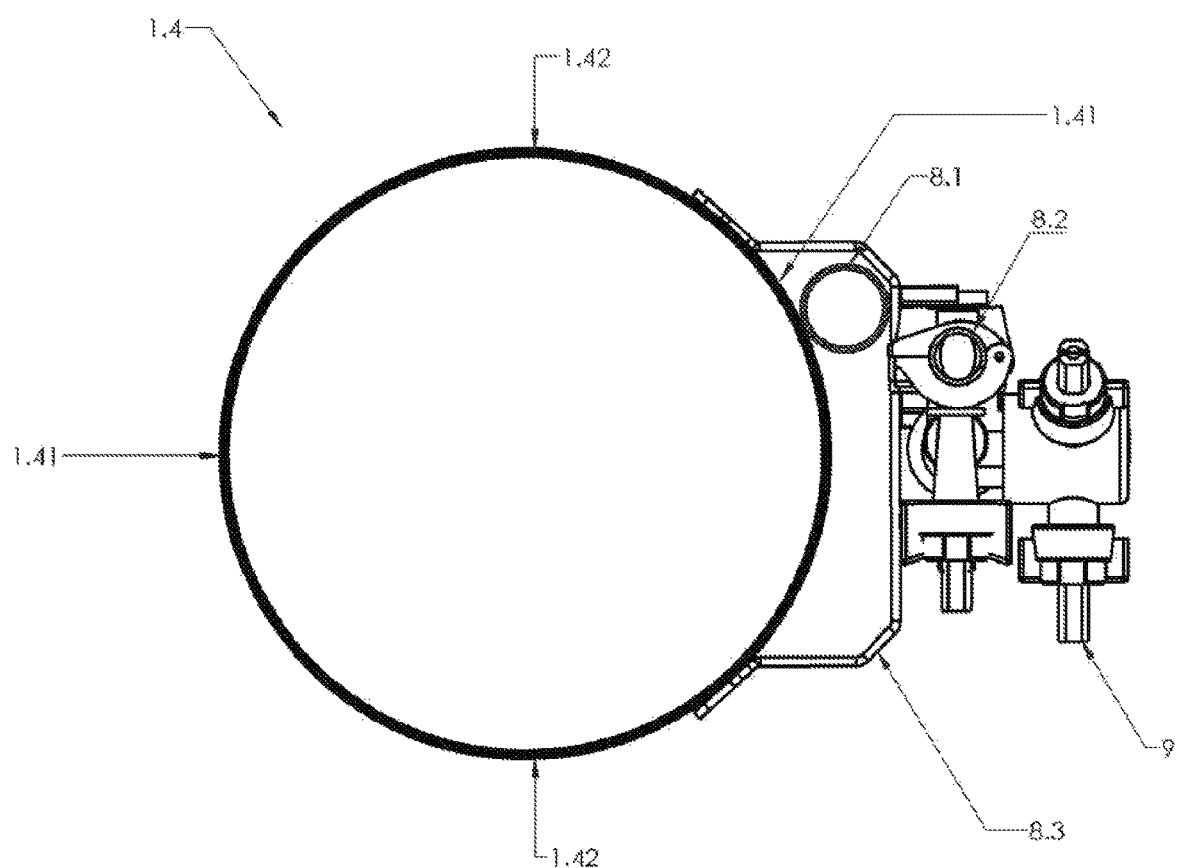
FIG. 3A represents a cross-sectional view of one of the bar sections that make up the articulated arm of FIGS. 1A, and 1B.
FIG. 3B represents a sectional side view of the bar section of FIG. 3A.
FIG. 3C represents a sectioned top view of the bar section of FIG. 3A.

As shown in FIG. 3A, the bar sections (1.1, 1.2, 1.3) have a tubular geometry of substantially circular cross-section (1.4) (but can be varied according to the design of the equipment), this section prevents them from accumulating on its surface the liquid spray products with which the plants are treated. In particular, the identification of the side perpendicular to the direction of advance (1.41) and the side parallel to the direction of advance (1.42) can be observed.

In FIG. 3B, the following constituent elements can be seen on the side perpendicular to the direction of advance (1.41): spray line feed hose (8.1); spray line (8.2); spray line support (8.3); and sprinkler spouts (9).

In FIG. 3C, can be seen on the side parallel to the direction of advance (1.42) another view of the following constituent elements: spray line feed hose (8.1); spray line (8.2); spray line support (8.3); and sprinkler spouts (9).

The structural configuration of the bar sections (1.1, 1.2, 1.3) of previously described material, forming articulated arms (1) due to the use of metal nodes in their joints (1.11, 5.1, 5.2, 1.21, 1.31), allows greater length with less weight than an equivalent metal structure, and allow a lower production cost than a structure constructed of synthetic material manufactured with another known manufacturing process.

The main bar section (1.1) has at its second end a metal flange (5.1) fixed with adhesive, pins, rivets, bolts, keys or other suitable joining means. The flange (5.1) in turn is linked to the metal flange (5.2) that is fixed to the first end of the secondary bar section (1.2). The link between 5.1 and 5.2 includes a mechanism that allows the folding of the articulated arm (1).

Figure 4A:
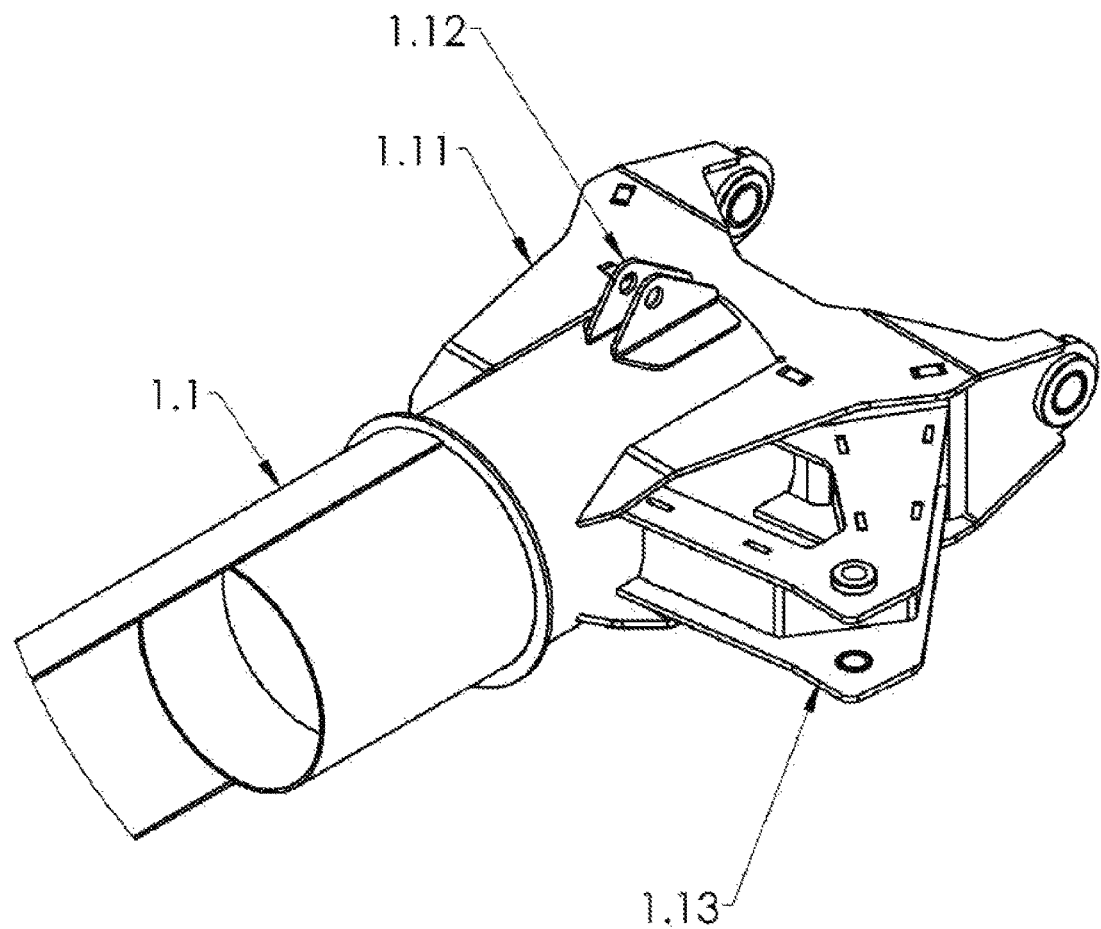
FIG. 4A shows the metallic node that articulates and links the first end of the composite main bar, where the metal flange is fixed with adhesive.
Figure 4:
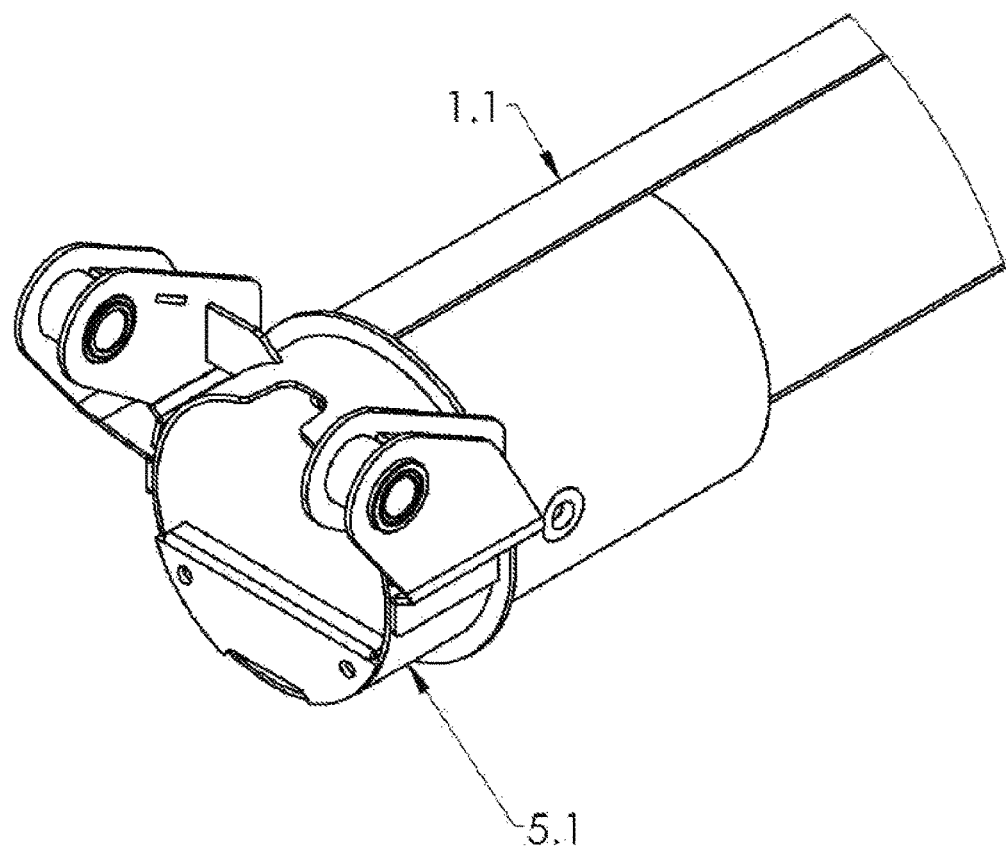
FIG. 4B shows the metal node that articulates and links the second end of the composite material main bar, where the metal flange is fixed with adhesive.
FIG. 4C shows a perspective of the joint where the flange is fixed with adhesive and the location of the bolt that links it to the central support section.
FIG. 4D represents a front view of the bolt that links the metal flange of the first end of the main bar to the central support section, shown in FIG. 4C.
Figure 4:
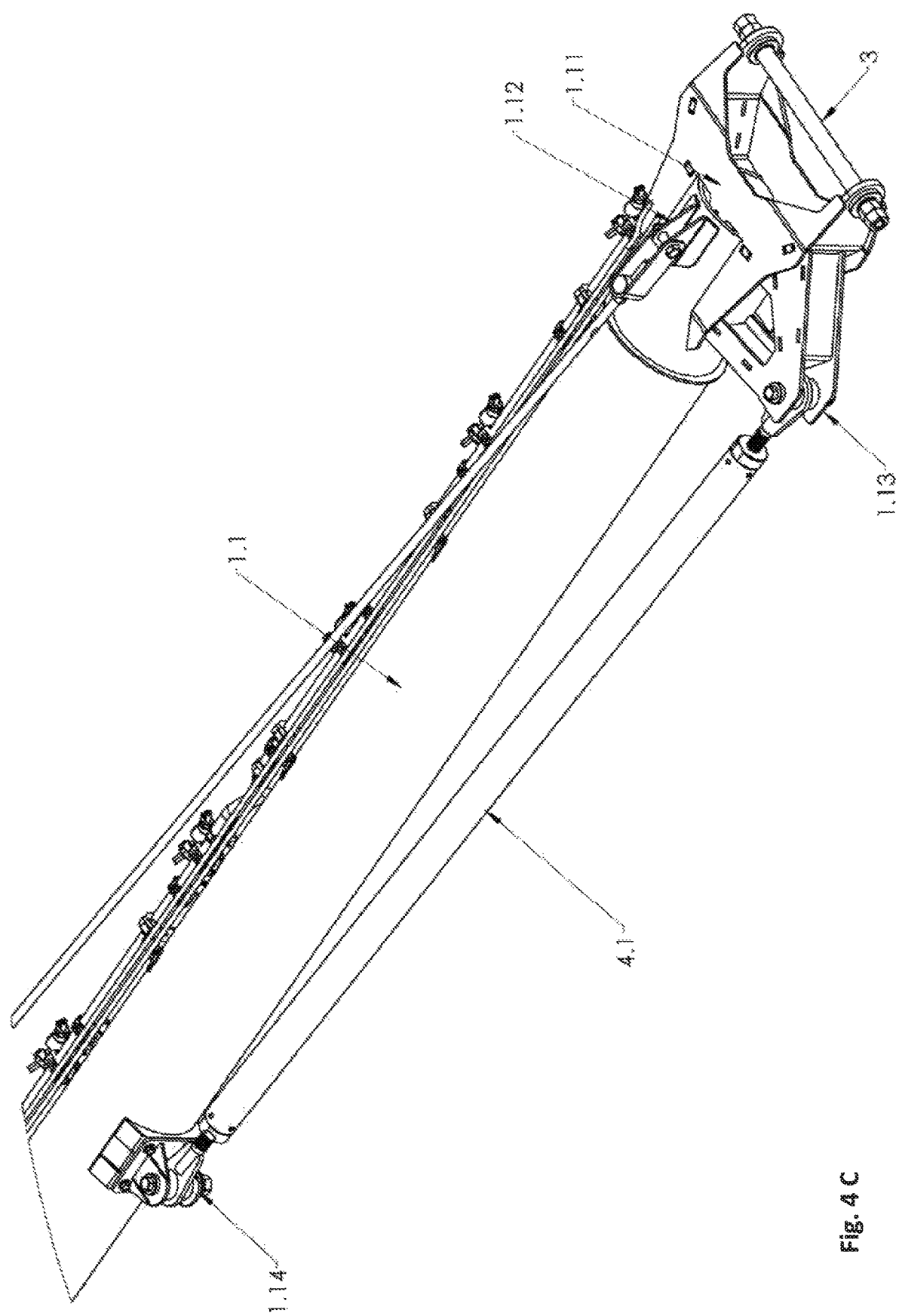
Figure 4:
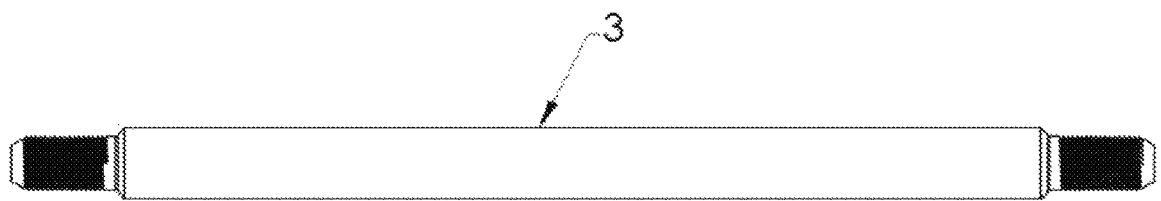

In FIGS. 4A, and 4B, the following can be identified: main bar section of composite material (1.1); metal flange fixed by adhesive to the first end of the main bar section (1.11); metal flange fixed by adhesive to the second end of the main bar section (5.1); tensioner support 4.1 (1.13) and tensioner support 4.2 (1.12).

The metallic flange fixed at the end of the composite tube allows it to maintain its section and thickness constant, therefore, it helps to lower the cost and, in addition, acts as a support for the tensioner (4.2), and for the tensioner (4.1) that goes to a metallic support (1.14) fixed to the same bar section (1.1).

In FIG. 4C, the layout of the constituent parts can be seen: main bar section of composite material (1.1); metal flange fixed to the first end of the main bar section (1.11); support (1.12) of tensioner 4.2; support (1.13) of the tensioner (4.1); pin link (3) to the central support (2); composite material and/or metal tensioner (4.1) running from a tensioner support (1.13) of the metal flange of the first end of the main bar (1.11) to a metal support (1.14) fixed to the same bar section (1.1), helps to decrease the transverse movement of the boom to the advance when accelerations and decelerations take place; and tensioner with adjustment to stabilize and stiffen the articulated arm (4.2).

In FIG. 4D you can see a detail of the bolt (3) that links the metal flange of the first end of the main bar (1.11) to the central support (2) of the sprayer chassis.

The break (5) of the articulated arm (1) for its storage or folding is made up of two metal flanges (5.1 and 5.2) joined to the second end of main bar and the first end of secondary bar, respectively, and linked together by a mechanism that allows folding.

The break mechanism is driven by a hydraulic cylinder (5.6) that provides the necessary force to produce the movement, it is fixed to a piece of machined aluminum (5.5), which has four rods of metallic material and/or of composite material (5.4) that are linked to the metal nodes (5.1 and 5.2) of the sections of the boom.

Figure 5:
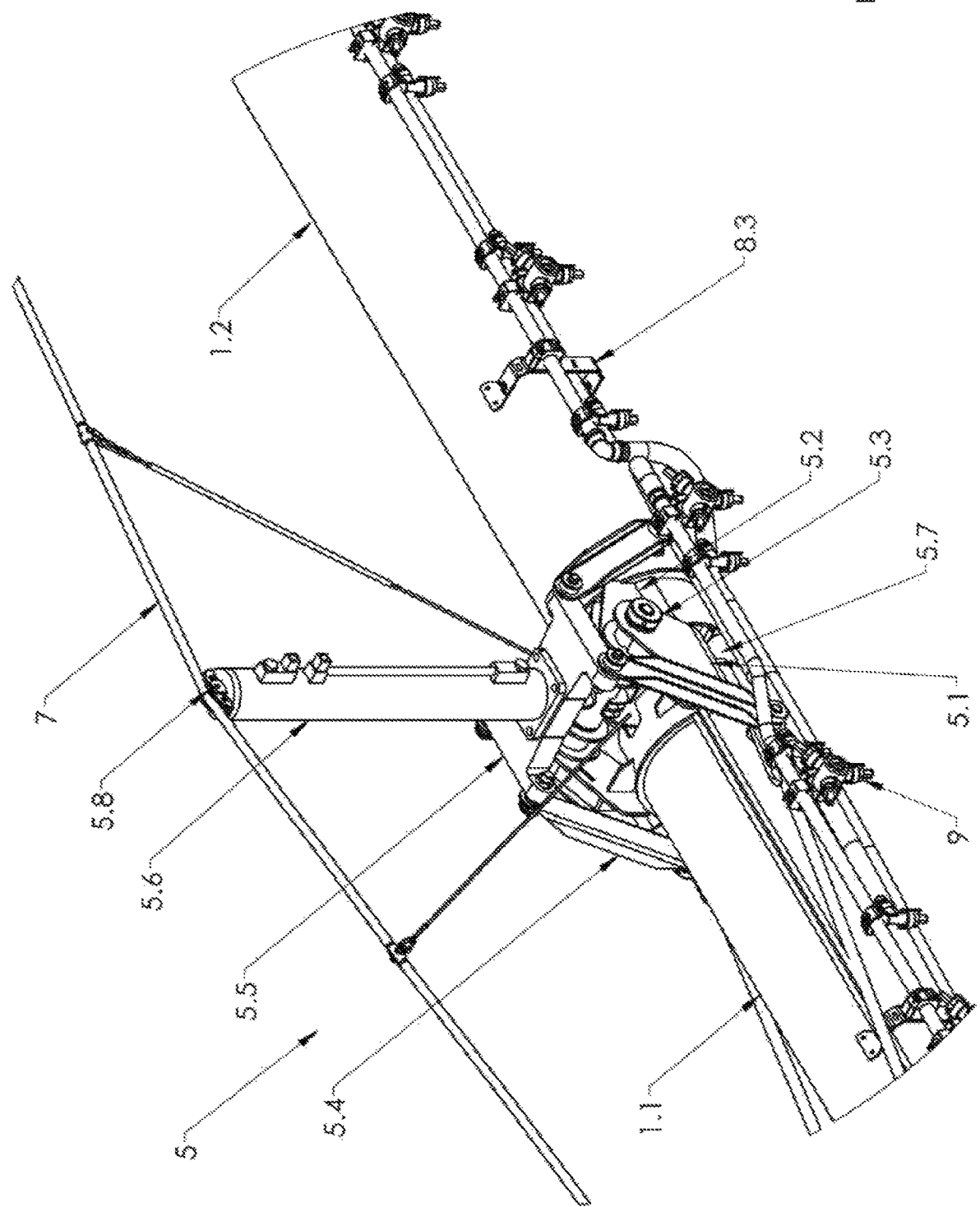
FIG. 5 represents a sectioned perspective view of the joint between the second end of the main bar section and the first end of the secondary bar section of the articulated arm of FIGS. 1A, and 1B.

In FIG. 5, it can be seen how the elements described above are arranged: main bar section of composite material (1.1); section of secondary bar of composite material (1.2); articulated arm break formed by metal nodes for storage or folding (5); metal flange fixed to the second end of the main bar section (5.1); metal flange fixed to the first end of the secondary bar section (5.2); boom breakage shaft (or articulated arm) (5.3); rods (5.4); hydraulic cylinder support (5.5); hydraulic cylinder for folding movement (5.6); stops (5.7); (rope) tensioning rope to stiffen the boom and ensure its folding (7); support for hose, conduits and wiring (8.3); tension rope guide pulley (5.8); and sprinkler spouts (9).

Figure 6:
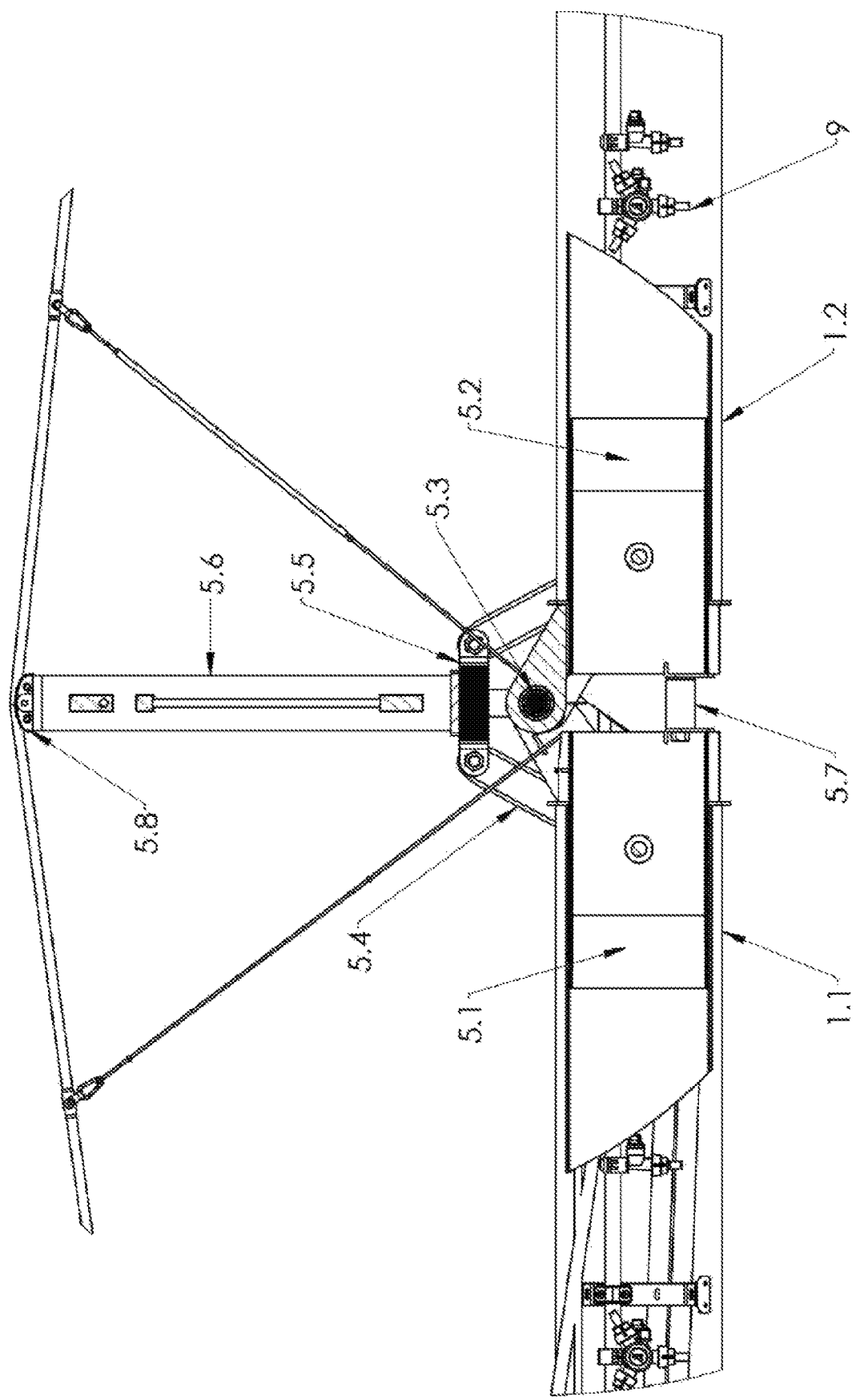
FIG. 6 represents a sectional side view of FIG. 5.

Meanwhile, FIG. 6 constitutes a sectional view of FIG. 5.

Figure 7:
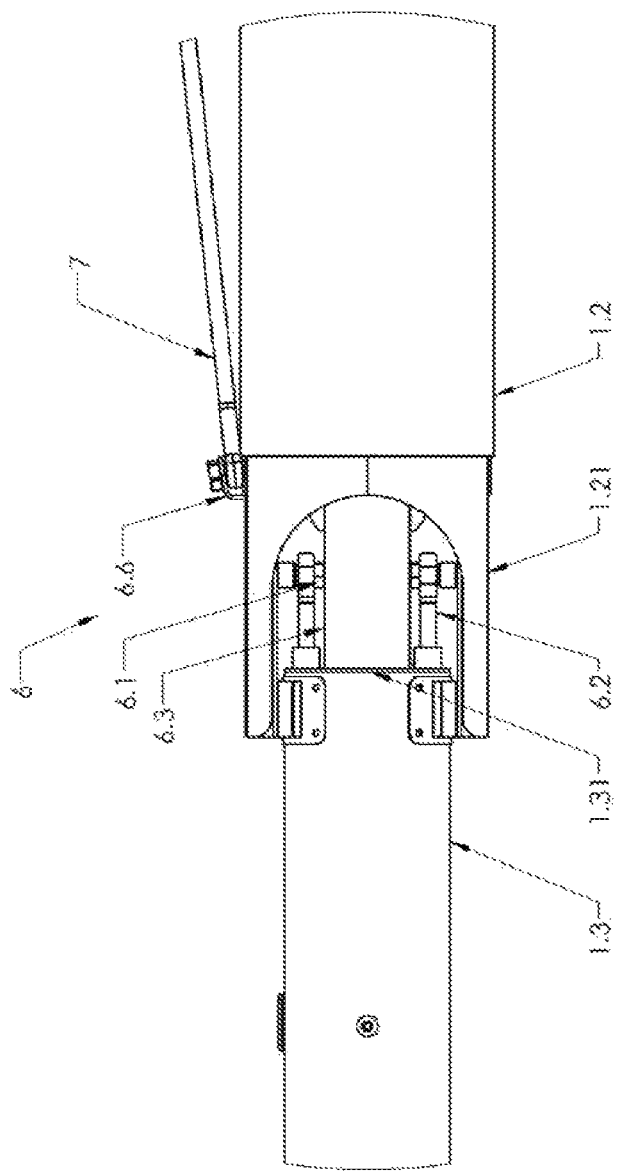
FIG. 7 shows a side view of the articulation between the second end of the secondary bar section and the first end of the last bar section of the articulated arm of FIGS. 1A, and 1B.

FIG. 7 shows the slip mechanism (6) of the last bar section (1.3) is composed of two lightweight bushings (slip reduction 6.4 and 6.5), which are fixed internally to the bar sections (1.2 and 1.3) by means of adhesive, or alternatively by mechanical bonding such as abutting, riveting, bolting, keying and the like, or also combinations thereof, and allowing a pneumatic elastic element composed of a tubular sleeve (6.3) to be housed, operated in pressurized form by compressed air. This sleeve, connected to a compressor housed in the sprayer, is the one that allows the movement of decoupling and re-coupling of the last section before any blow with a blunt object during the movement of the sprayer, this fast and precise movement is called "Pop-Up". The sleeve is housed and fixed internally between the second end of the second bar (1.2) and the first end of the last section of bar (1.3). The break system thus prevents possible breakage of the last section during the movement and work of the sprayer. The compressed air system, in addition to ensuring the first end of the last section of bar alignment, results in a simple, economical, efficient and lightweight design.

In said FIG. 7, the constituent parts of the joint between the second end of the secondary bar section and the first end of the last bar section are shown, namely: secondary bar section of composite material (1.2); last section of composite material bar (1.3); metal flange fixed (1.21) to the second end of the secondary bar section; metal flange fixed (1.31) to the first end of the last bar section; slip mechanism of the last section (6); slip pivot shaft (6.1); movement knee (6.2); compressed air hose (Pop-Up system) (6.3); slip reduction (6.4); slip reduction (6.5); fixing anchor of tensioning rope (6.6); tensioning rope (7) to stiffen the boom and ensure its folding.

Figure 8:
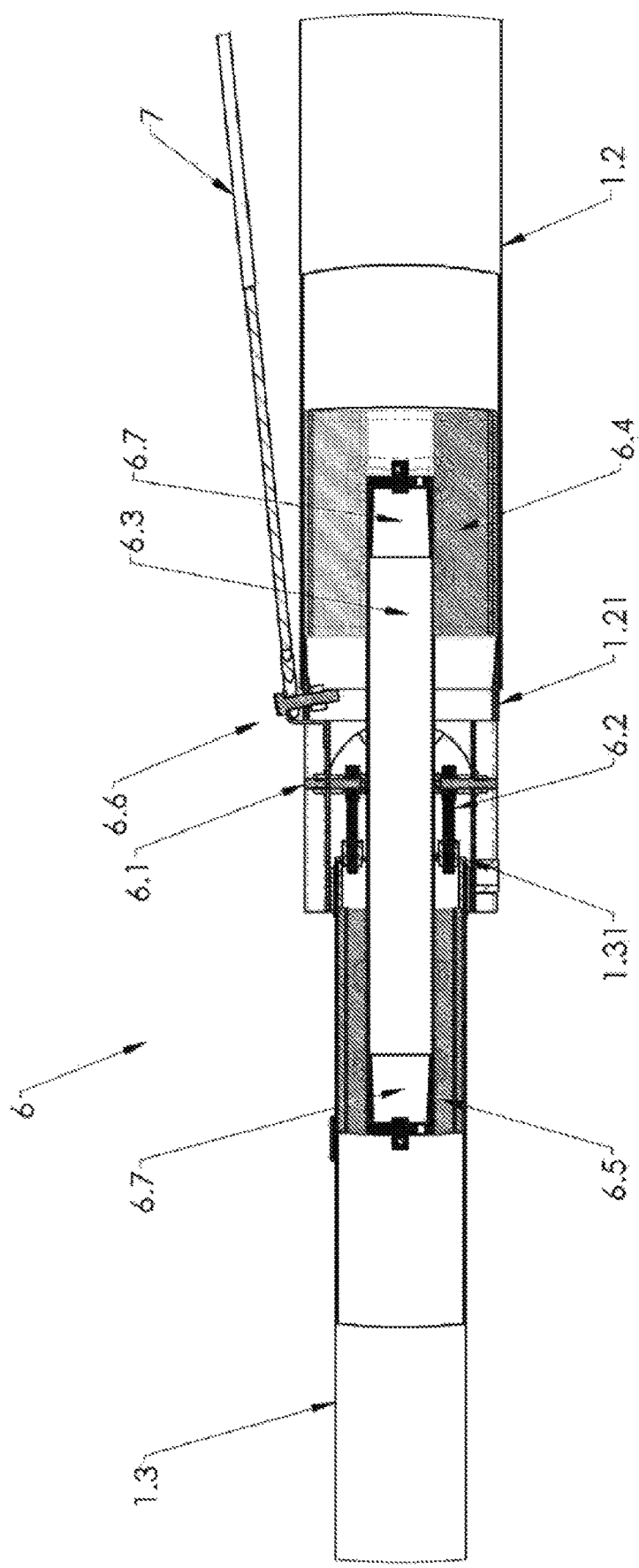
FIG. 8 represents a sectional view of FIG. 7.

FIG. 8 represents a sectional view of FIG. 7 showing the same elements as in said FIG. 7, plus the compressed air sleeve tip (6.7).

In the set of tensioners (4), we can differentiate the tensioner (4.1) from the rest of the tensioners (4.2, 4.3, and 4.4). The main function of the composite material and/or metal tensioner (4.1), which goes from a tensioner support (1.13) of the metal flange of the first end of the main bar (1.11) to a metal support (1.14) fixed to the same section of bar (1.1), is to help the stability of the articulated arm (1) against accelerations, decelerations and other movements of the sprayer. In addition, this tensioner (4.1) allows the section of the main bar section (1.1) to be constant throughout its length, and equal to the section of secondary bar (1.2), so that the main and secondary bar sections are manufactured with the same mold.

The other tensioners (4.2, 4.3, and 4.4) help to stabilize the boom when the sprayer applies the product in the field. These tensioners can be metallic and/or composite materials, in addition they allow the regulation of the tension necessary for the correct functioning of the articulated arms (1). The pillar (4.5) can be metallic and/or made of composite material, it is fixed to a support base of metallic and/or composite material (4.6) that is fixed with adhesive or mechanically to the first section of bar (1.1). This base allows easy replacement and distributes the load evenly on the tube. The pillar, in addition to distributing the forces of the tensioners, allows the support of the secondary section (1.2) when the arm (1) is folded.

The stabilization tensioners are formed by a composite material consisting of a reinforcing agent selected from carbon fiber, fiberglass, aramid fiber, boron fiber or a combination thereof, and a matrix of epoxy, vinyl ester, phenolic, polyurethane, polyester resins or thermoplastic material.

Figure 9:
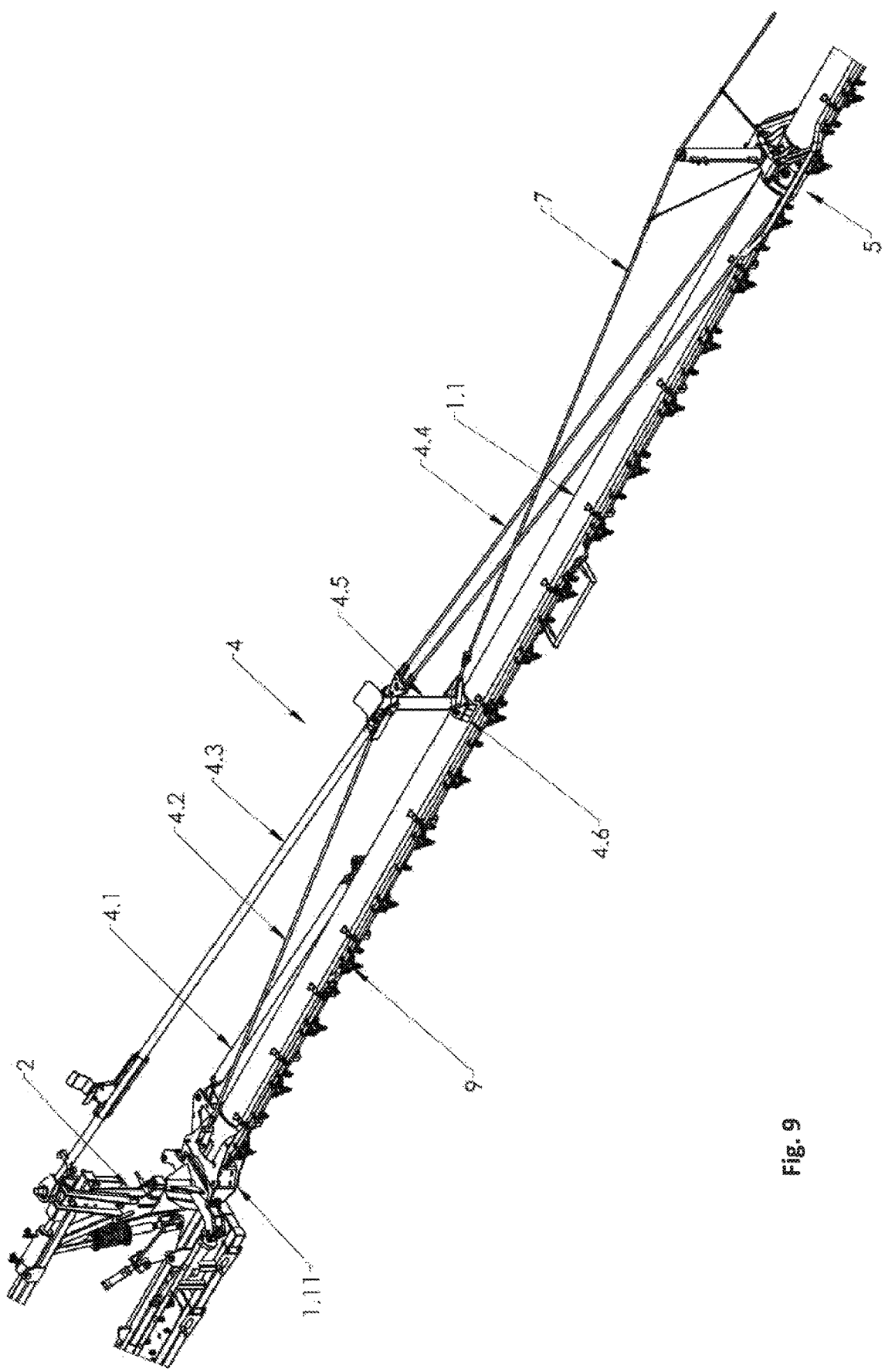
FIG. 9 shows the set of tensioners whose function is to, on the one hand, decrease the transverse movement of the boom to the advance when accelerations and decelerations occur and, on the other, to stabilize and stiffen the articulated arm.

In FIG. 9, it can be seen the arrangement of the constituent parts mentioned above: central boom support fixed to the chassis of the sprayer (2); metal flange of the first end of the main bar (1.11), main bar section of composite material (1.1); set of tensioners (4); composite and/or metal tensioner (4.1) that helps to reduce the transverse movement of the boom to the advance when accelerations and decelerations take place; tensioner with adjustment to stabilize and stiffen the articulated arm (4.2); tensioner with adjustment to stabilize and stiffen the articulated arm (4.3); tensioner with adjustment to stabilize and stiffen the articulated arm (4.4); pillar with movement (4.5); pillar support flange fixed to the main bar section (4.6); articulated arm break formed by metal nodes for storage or folding (5); tensioning rope to stiffen the boom and ensure its folding (7); and sprinkler spouts (9).

Each articulated arm comprises sections of bar with a tubular profile, for example of round, oval section, or another section of rounded faces, formed of a composite material, for example, plastic reinforced with carbon fiber, fiberglass, etc., manufactured by the process of "Filament Winding" or another robotic process such as "Automated Tape Placement", "Automated Fiber Placement", "Pultrusion" or "Pullwinding Technology" and metallic nodes in the articulation areas, resulting in a modular boom, where the use of tubes allows to modify their length, adjust thickness and/or the sequence of the laminate, only changing the tubes without the need for complex molds, while the metal nodes facilitate the repair without the need to replace the entire tube, this results in a reduction of maintenance cost as well as the cost of the whole in a considerable way.

The manufacturing process of the sections of the composite material bar is preferably by the "Filament Winding" method, which is typically carried out with robotic machinery. Likewise, another robotic method such as "Automated Tape Placement", "Automated Fiber Placement", "Pultrusion" or "Pullwinding Technology" can be used as a production process.

Composite materials allow a low weight of each section thanks to the network of continuous fibers of high strength and specific stiffness (i.e. in relation to their density) and the plastic matrix with which they are manufactured. In addition, the production method allows reducing the manufacturing time of the tube, achieving an optimization in the cost of the boom.

The cylindrical sections use a stack of layers with predominantly longitudinal orientation, combined with layers with helical and circumferential orientation, designed to withstand the axial, bending and other stresses that appear during the operation of the boom.

Figure 10:
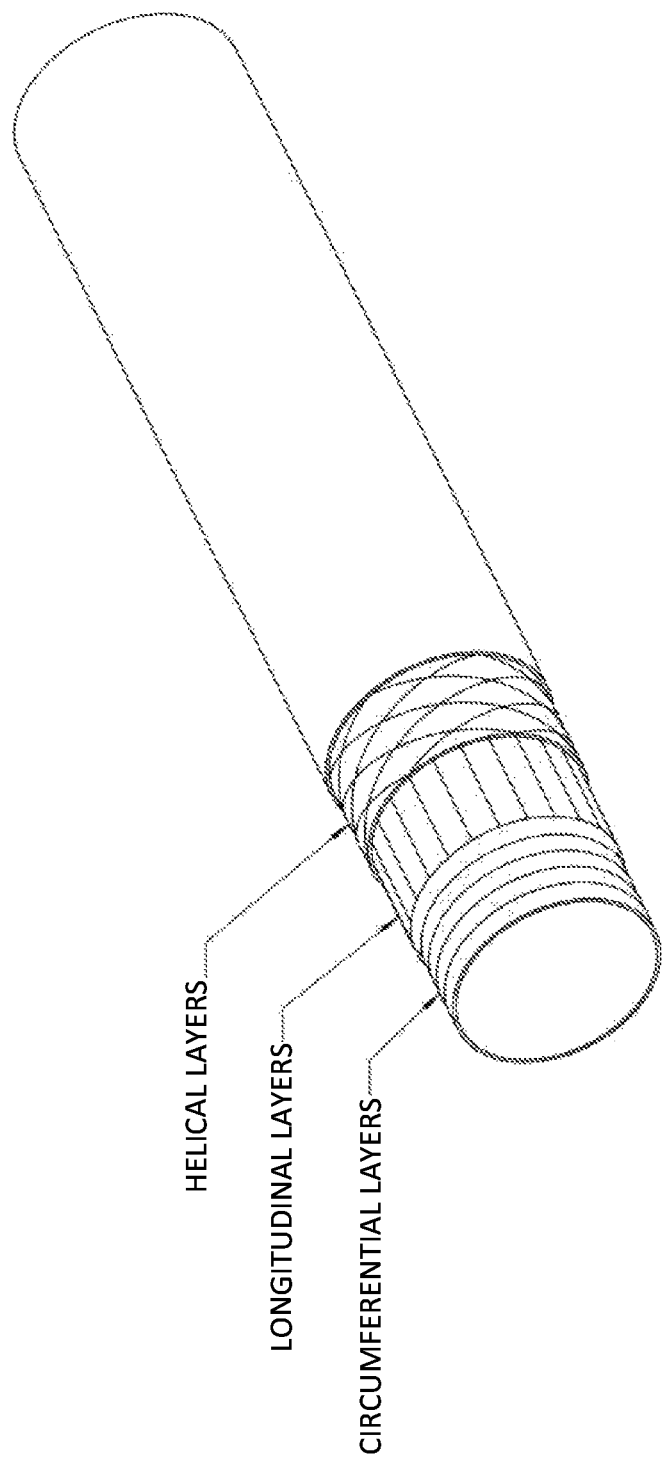
FIG. 10 shows a detail of the layers of a section of the articulated arm of composite material obtained by the manufacturing process of "Filament Winding".

FIG. 10 shows a detail of the different types of layers of a section of the articulated arm of composite material obtained by a robotic manufacturing process such as "Filament Winding", "Automated Tape Placement", "Automated Fiber Placement", "Pultrusion" or "Pullwinding Technology", which allows to obtain low weight profiles due to the continuous fiber structure of high strength and specific rigidity in plastic matrix with which they are manufactured. The reinforcing fibers can be arranged in circumferential layers, longitudinal layers and superimposed helical layers.

Figure 11:
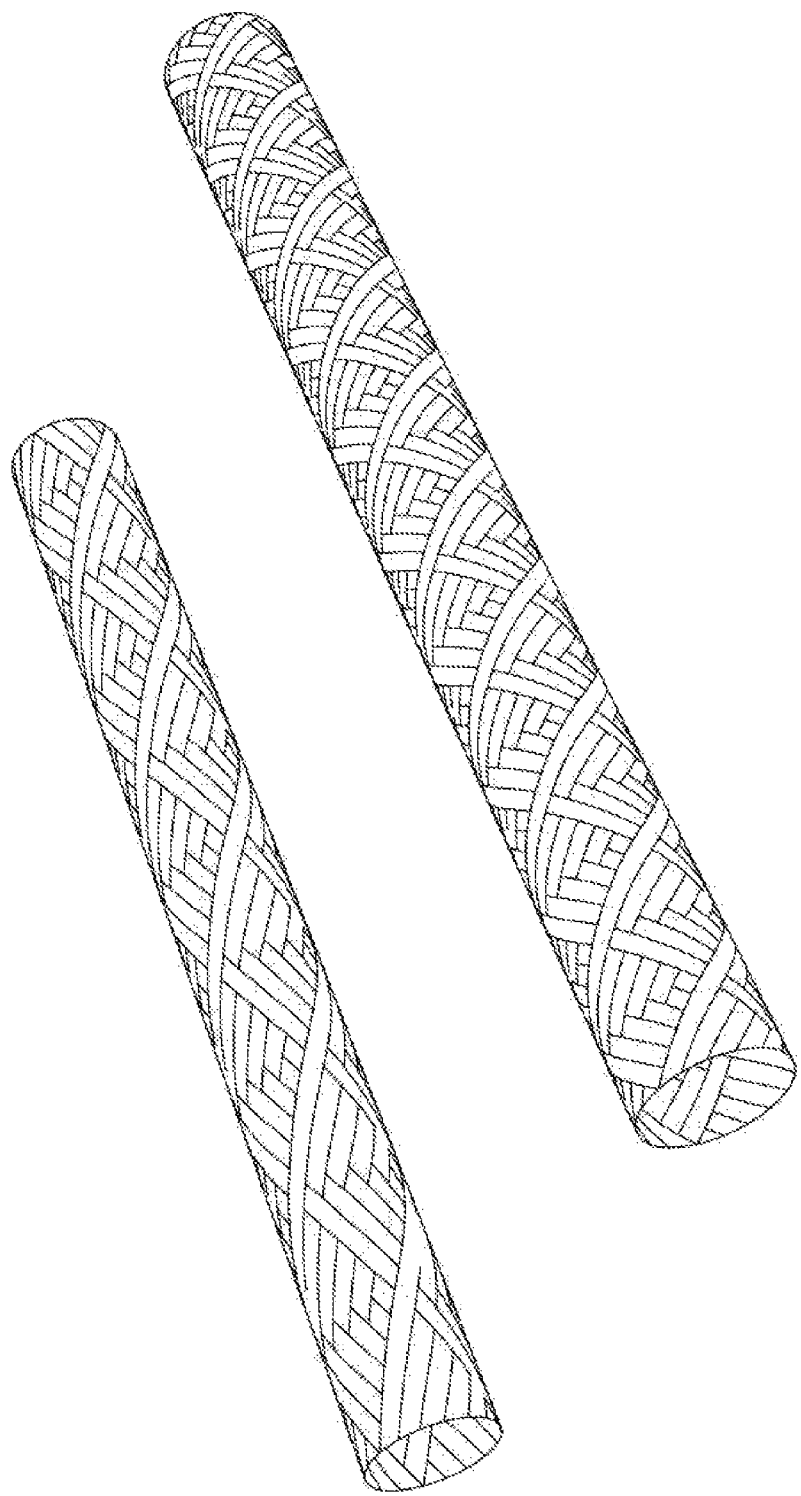
FIG. 11 shows the pattern of the identifiable framework on the visible surface of the tubular sections of the composite articulated arm.

FIG. 11 shows the pattern of the identifiable framework on the visible surface of the tubular sections of the articulated arm of composite material, formed by woven carbon fibers and arranged in the last layer at an angle of between approximately 10 degrees and approximately 40 degrees in terms of sexagesimal degrees with respect to the generatrix or longitudinal axis of the tubular sections, which can form drawings of triangles and/or rhombuses along the section.

In order to provide greater stability to the system as a whole, the articulated arms (1) can integrate, in any of the metal nodes that make up the joints, a folding wheel (12) that is commanded from the cockpit or automatically.

Figure 12:
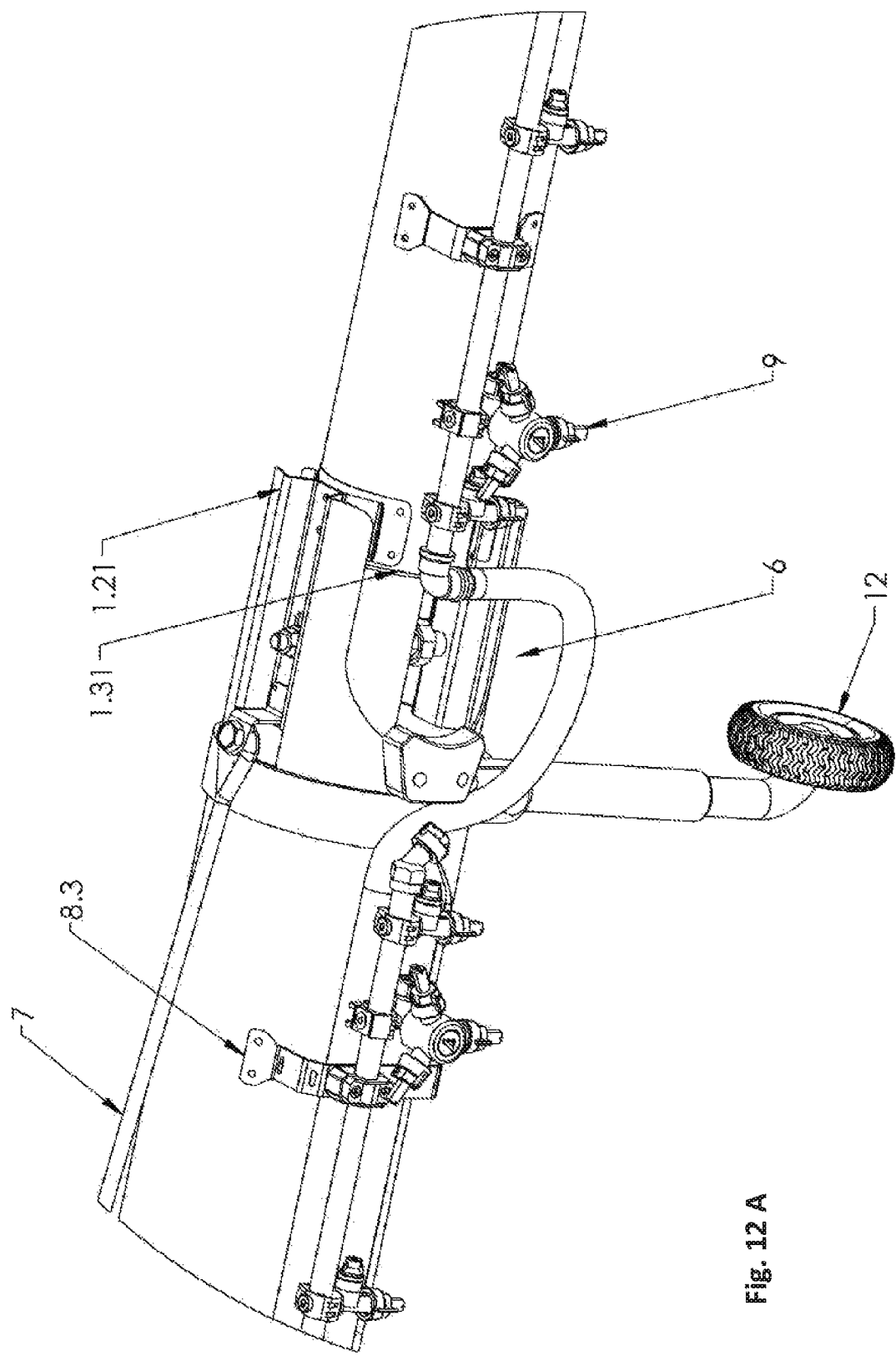
FIG. 12A shows a preferred form of embodiment of a folding wheel to give greater stability to the articulated arms and which can be located in the different joints thereof, where said wheel is deployed.
FIG. 12B shows a preferred embodiment of a folding wheel to give greater stability to the articulated arms and which can be located in the various joints thereof, wherein said wheel is folded.
Figure 12:
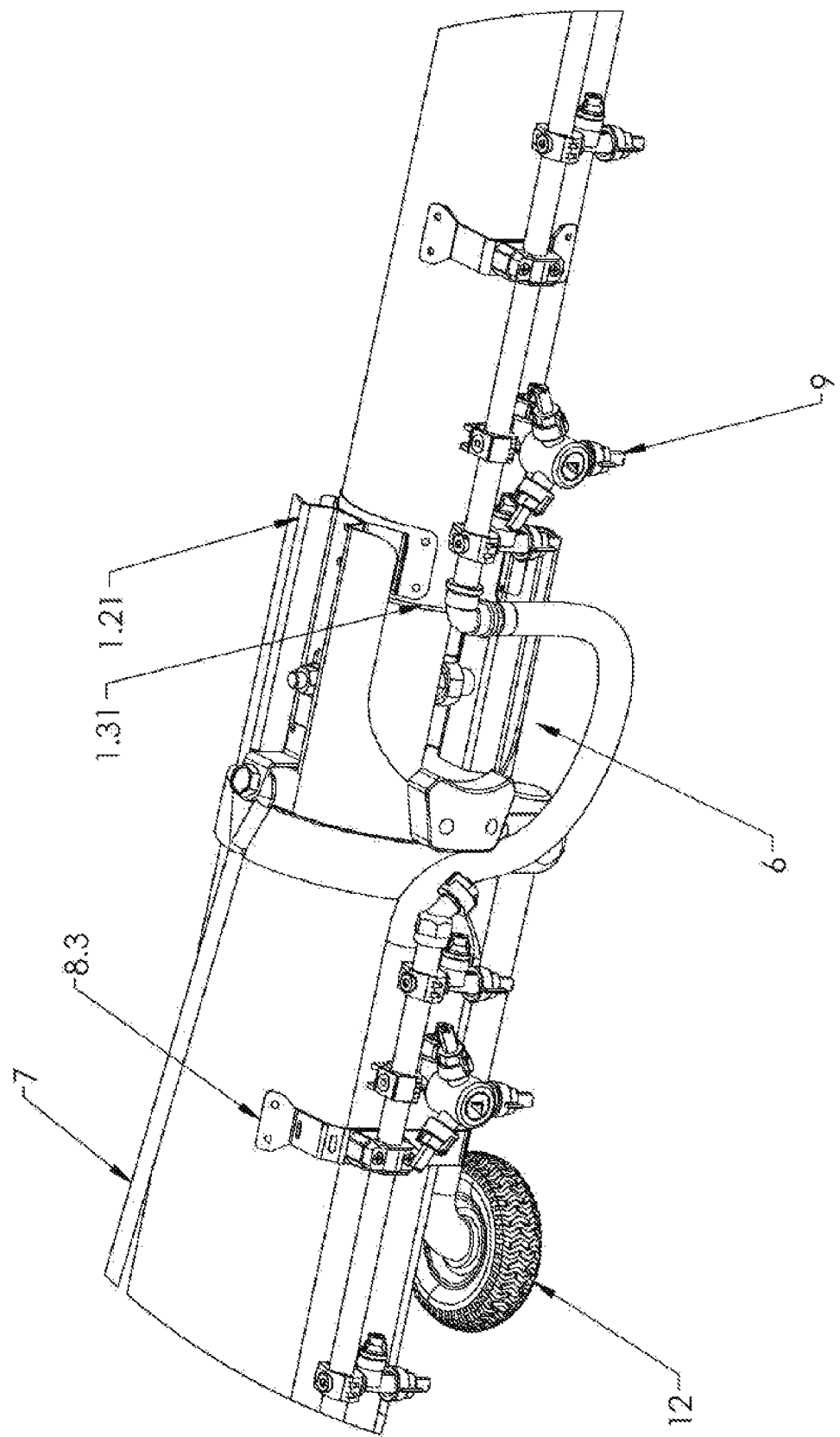

In relation to this constructive alternative, in FIGS. 12A and 12B the following can be seen: metal flange fixed to the second end of the secondary bar section (1.21); metal flange fixed to the first end of the last bar section (1.31); slip mechanism of the last section (6); tensioning rope to stiffen the boom and ensure its folding (7); support for hose, conduits and wiring (8.3); sprinkler spouts (9); and folding support wheel for greater stability (12), wherein said folding wheel is shown unfolded (FIG. 12A) and folded (FIG. 12B).

Due to the material with which the sections of bar are manufactured and their cross section that remains constant along each of the sections is possible, before a break, easily and quickly repair the section of damaged bar in the field itself, without have to move to a workshop that may be distant from where the work is carried out. For this, two repair kits can be counted, one for break in the last bar section (10.1) whose simplicity can be applied by the operator of the sprayer, and another for a severe break (11.1) in the two main sections of the bar.

The breakage kit of the last bar section (10.1) consists of pieces made of the same material that are easily changed, fixing them on both sides by adhesive, pins, rivets, bolts, keys or other suitable joining method.

Figure 13:
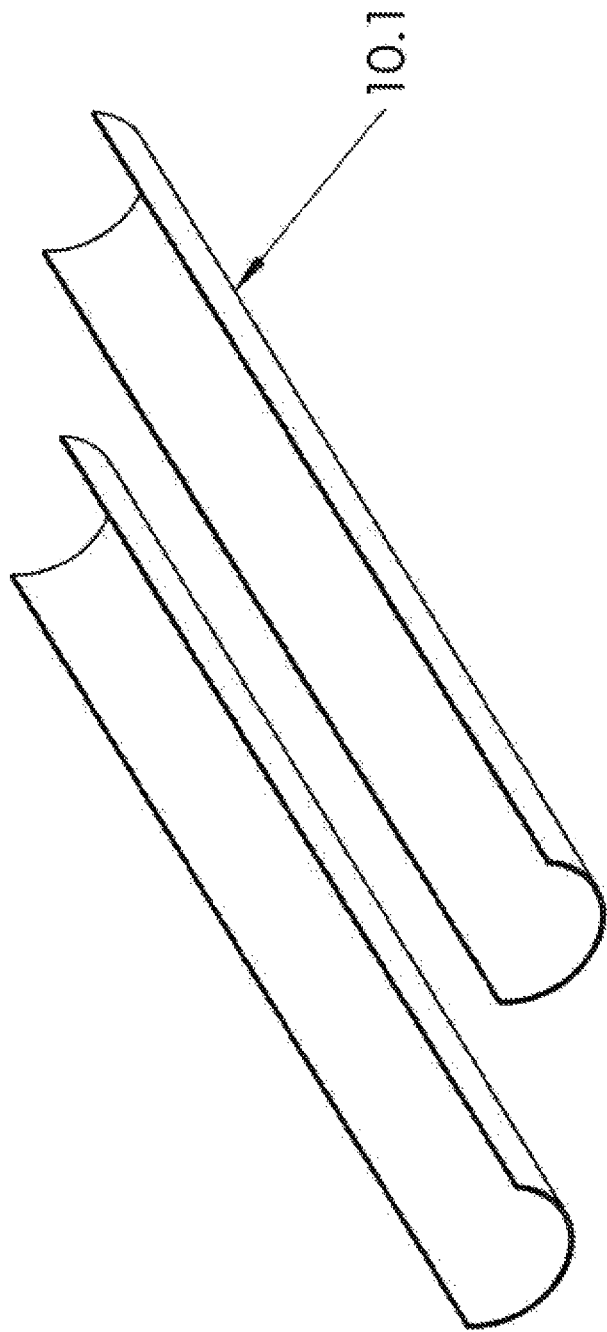
FIG. 13 is a schematic representation of the parts of the repair kit of the last bar section of the articulated arm shown in FIGS. 1A, and 1B.

In FIG. 13, you can see a schematic representation of the parts of the repair kit of the last bar section of the articulated arm, where each piece of the kit (10.1) is identified for repairing the last section.

Figure 14:
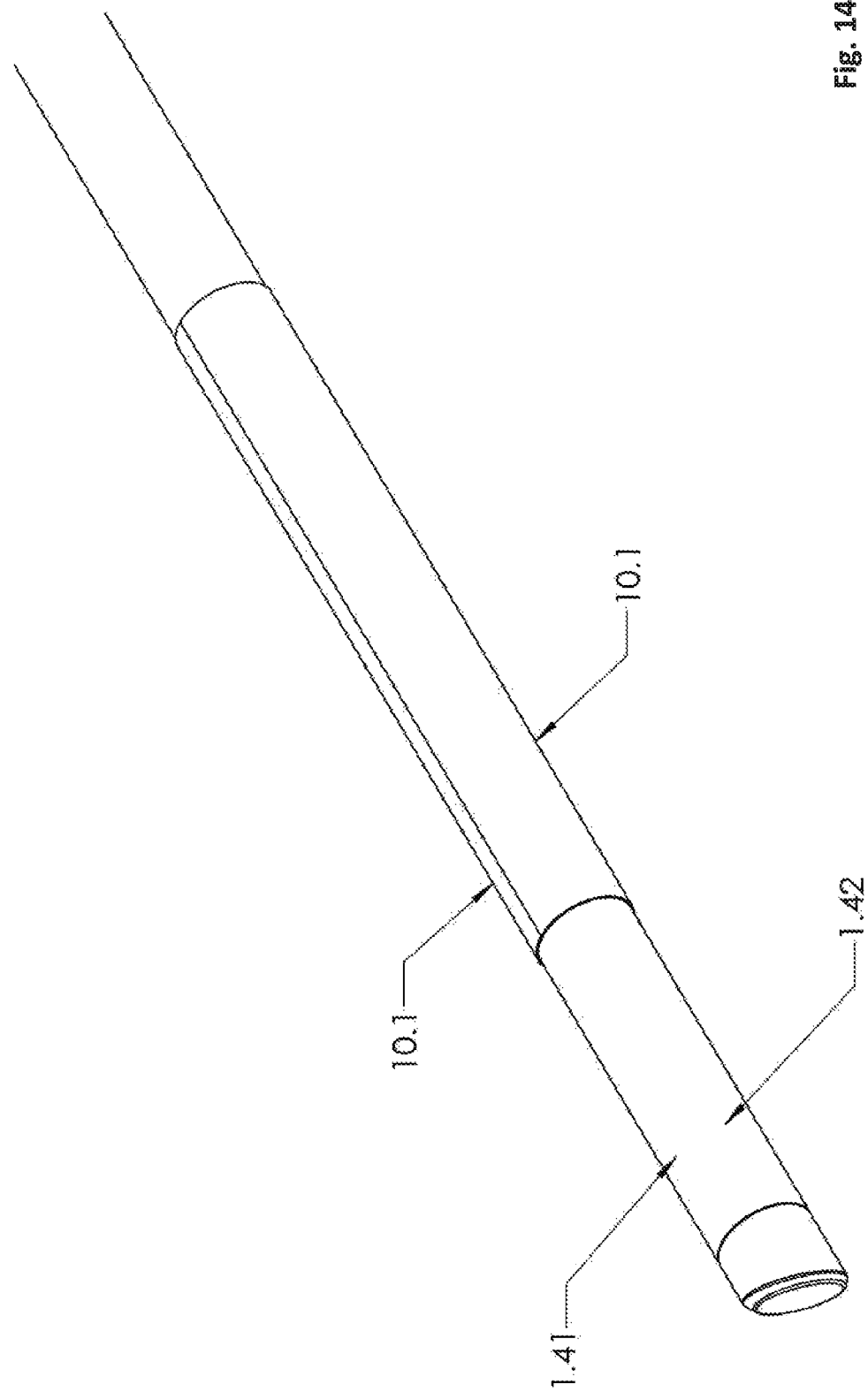
FIG. 14 is a schematic representation of the parts of the repair kit shown in FIG. 13, placed at the last bar section of the articulated arm of FIGS. 1A, and 1B.

FIG. 14 schematically represents the parts of the repair kit placed at the last section of the bar of the articulated arm, where it is shown: the parts of the kit for repair of the last bar section (10.1); side perpendicular to the direction of advance (1.41); and side parallel to the direction of advance (1.42).

When a severe break is suffered in any of the two sections of bar (1.1) and (1.2), being these of the same section, a cut of equal length is made to the spare section of the same composite material. That spare section (11.1) of standardized measurement, has tubular ends and external section equal to the internal section of the sections, which allows to fit them and fix them by adhesive, pins, rivets, bolts, keys or other suitable joining method, or combinations thereof, to the two sections of the tube that will be damaged, being repaired and in the original length.

Figure 15:
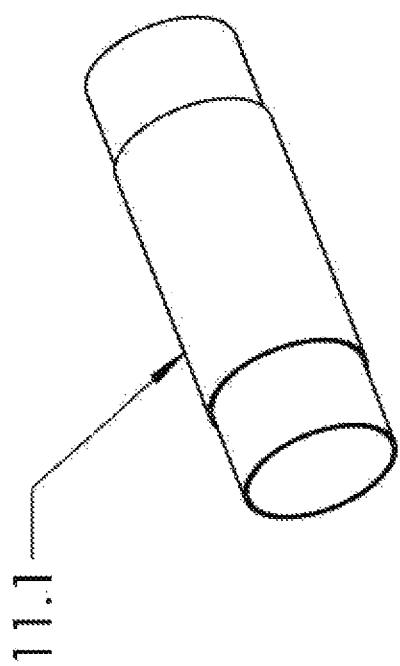
FIG. 15 is a schematic representation of the repair kit part of either of the two sections (main or secondary) of the articulated arm shown in FIGS. 1A, and 1B.

FIG. 15 is a schematic representation of the repair kit part of either of the two sections, either the main or the secondary, of the articulated arm. There you can see the piece (11.1) that constitutes this kit in perspective.

Figure 16:
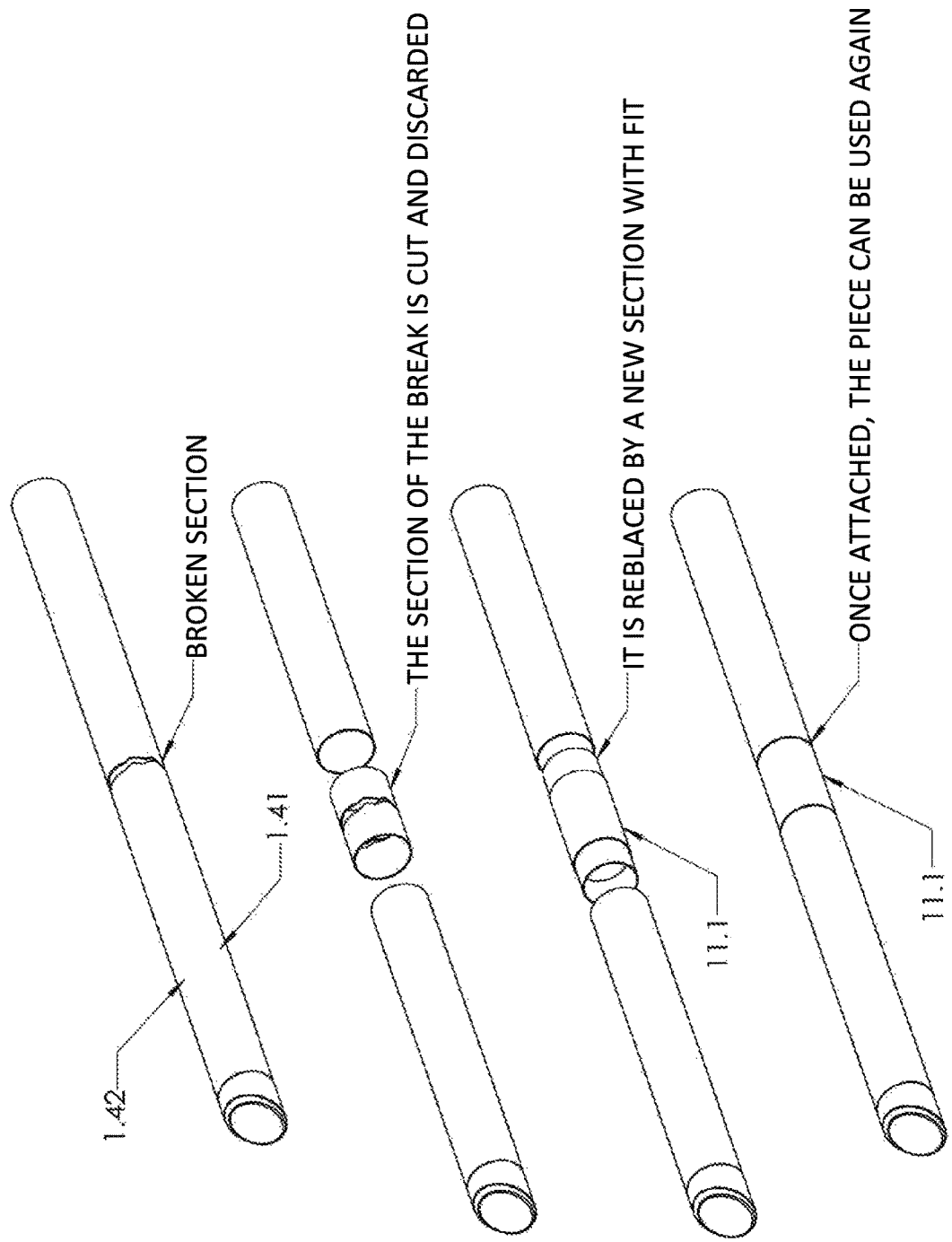
FIG. 16 is a schematic representation of the part of the repair kit shown in FIG. 15, placed in either of the two sections (main or secondary) of the articulated arm shown in FIGS. 1A, and 1B.

FIG. 16 is a schematic representation of the part of the repair kit placed in either of the two main or secondary sections of the articulated arm detailing the repair stages successively from top to bottom. The references indicate the following: kit for repair of any of the two sections of main or secondary bar (11.1); side perpendicular to the direction of advance (1.41); and side parallel to the direction of advance (1.42).

In a preferred embodiment of the present invention, the hose that acts as the supply conduit (8.1) of the spray line (8.2) and where the spray nozzles (9) are connected goes outside the sections of material bar compound, thus avoiding the need to pierce and consequently weaken the articulated arm (1), also allowing rapid assembly and/or possible replacement of hoses and/or electrical and hydraulic wiring if necessary. For all this, a special support (8.3) has been designed. The fixing of this support (8.3) to the tubes of composite material is given by adhesive, pins, rivets, bolts, keys or other suitable joining method.

Figure 17:
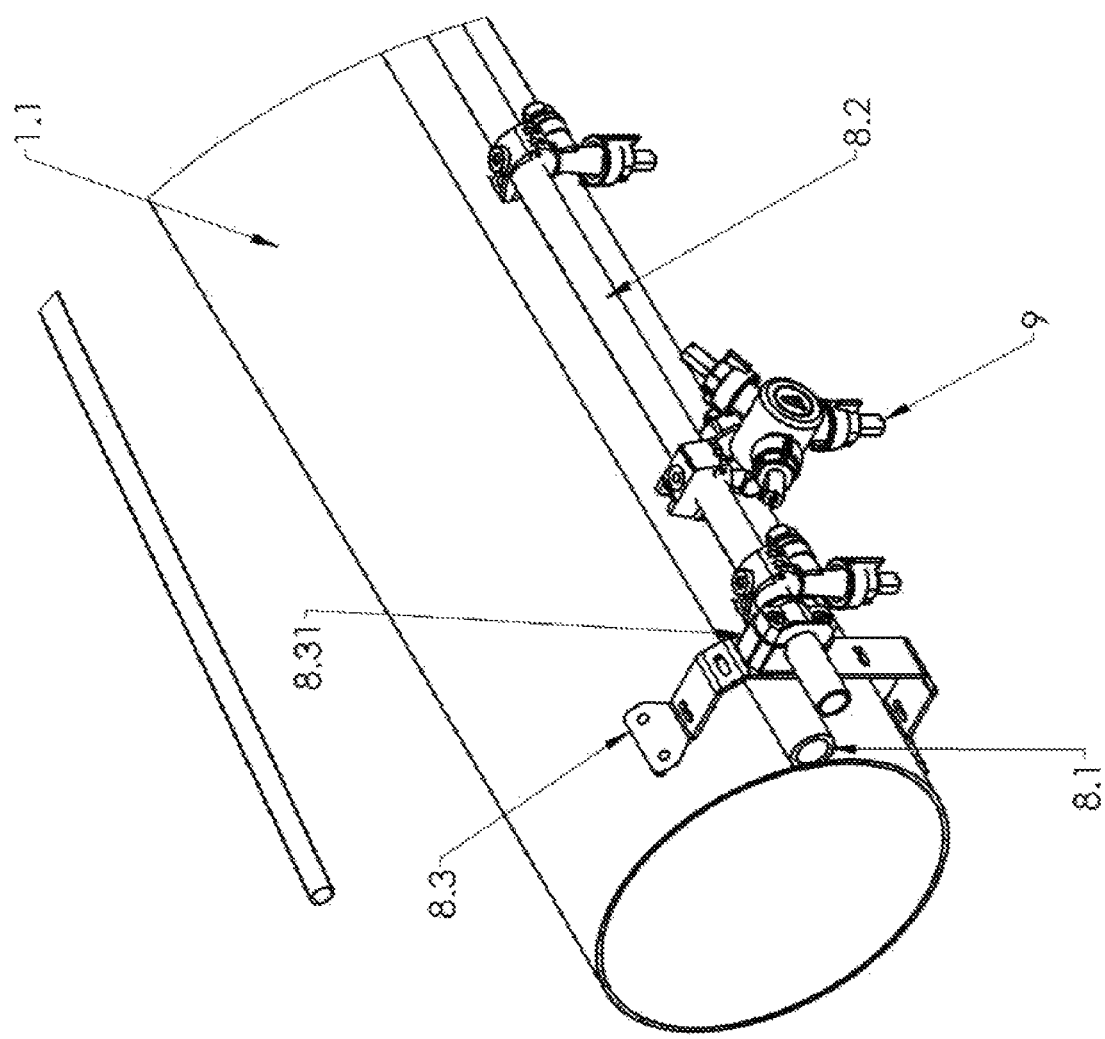
FIG. 17 shows a section of a bar section where the special metal support can be seen for mounting and positioning the hoses and the wiring outside the composite tubes of the articulated arm.

In FIG. 17, it can be seen a section of a bar section where the special support (8.3) can be appreciated that allows easy assembly and positioning of hoses and wiring outside the tubes of composite material. The fixing of this support (8.3) to the tubes of composite material is done by adhesive, pins, bolts, rivets, keys or other suitable joining method.

The parts that can be identified in FIG. 17 are the following: main bar section of composite material (1.1); spray line (8); spray line feed line (8.1); sprinkler spout (8.2); special support (8.3); fixing piece (8.31); and sprinkler spouts (9).

The invention claimed is:

1. A modular spraying boom support for an agricultural sprayer, comprising:
a pair of articulated arms, wherein each of the articulated arms is coupled to a central support section of a sprayer chassis, wherein each of the articulated arms comprises:
a plurality of rope stabilization tensioners comprising a composite material and/or a metallic material,
three beam sections each comprising a composite material, the three beam sections further comprising a main beam section, a secondary beam section and a last beam section, wherein each of the main beam section, the secondary beam section, and the last beam section is formed from a single tube of constant section and comprising a tubular profile, and
a plurality of metal nodes comprising a main node comprising a main flange, a secondary folding node comprising a proximal secondary flange and a distal secondary flange, and a last node comprising a proximal last flange and a distal last flange, wherein:
the main node is coupled to the central support section and the main flange is coupled to a proximal end of the main beam section by a main coupling component comprising an adhesive,
the proximal secondary flange is coupled to a distal end of the main beam section by a proximal secondary coupling component and the distal secondary flange is coupled to a proximal end of the secondary beam section by a distal secondary coupling component, wherein the proximal and distal secondary coupling components each comprise an adhesive, and
the proximal last flange is coupled to the distal end of the secondary beam section by a proximal last coupling component and the distal last flange is coupled to a proximal end of the last beam section by a distal last coupling component, wherein the proximal and distal last coupling components each comprise an adhesive.

2. The modular spraying boom support of claim 1, wherein the composite material of the three beam sections comprises a reinforcing agent selected from the group consisting of carbon fiber, fiberglass, aramid fiber, boron fiber and combinations thereof, and a matrix selected from the group consisting of epoxy, vinyl ester, phenolic, polyurethane, polyester resins, thermoplastic material and combinations thereof.

3. The modular spraying boom support of claim 1, wherein each tubular profile is closed weft, wherein the closed weft covers an entire surface of the tubular profile.

4. The modular spraying boom support of claim 2, wherein each tubular profile is open weft, wherein fibers of the open weft form a structure selected from the group consisting of an isometric grid structure and an isometric weft structure.

5. The modular spraying boom support of claim 1, wherein the three beam sections are manufactured through a robotic process selected from among the group consisting of winding of fibers, automated tape placement, automated fiber placement, pultrusion, pultrusion associated with fiber winding and combinations thereof.

6. The modular spraying boom support of claim 1, wherein the metal nodes comprise a material selected from the group consisting of steel, titanium, magnesium, aluminum, and combinations thereof.

7. The modular spraying boom support of claim 1, wherein each of the articulated arms further comprise a folding wheel coupled to at least one of the metal nodes.

8. The modular spraying boom support of claim 1, wherein the coupling component further comprises an element selected from the group consisting of a pin, a rivet, a bolt, a key, and combinations thereof.

9. The modular spraying boom support of claim 1, wherein the plurality of rope stabilization tensioners comprise a composite material, and the composite material of the plurality of rope stabilization tensioners comprise a reinforcing agent selected from the group consisting of fiber carbon, fiberglass, aramid fiber, boron fiber and combinations thereof, and a matrix selected from the group consisting of epoxy, vinyl ester, phenolic, polyurethane, polyester resins, thermoplastic material and combinations thereof.

10. The modular spraying boom support of claim 1, wherein cross sections of the main and secondary beam sections are constant throughout a length of the main and secondary beam sections, and wherein shapes of the main and secondary beam sections are substantially the same.

11. The modular spraying boom support of claim 1, wherein the last beam section comprises a slip mechanism, wherein the slip mechanism comprises a pneumatic elastic element comprising a tubular sleeve, wherein the tubular sleeve is configured to be pressurized.

12. The modular spraying boom support of claim 1, wherein each of the articulated arms further comprises a spray line in fluid communication with an applicator, an electrical wiring, a hydraulic conduit and additional supports, wherein the additional supports couple the spray line, applicator, electrical wiring and hydraulic conduit to at least one of the three beam sections.

13. The modular spraying boom support of claim 12, wherein the additional supports comprise a coupler selected from the group consisting of adhesive, pins, rivets, bolts, keys and combinations thereof.

14. The modular spraying boom support of claim 12, wherein the additional supports comprise a coupler comprising an adhesive.

15. The modular spraying boom support of claim 1, wherein the composite material of the three beam sections comprises a web formed by continuous reinforcing fibers intertwined and arranged in a surface layer of the composite material, wherein the continuous reinforcing fibers form shapes selected from the group consisting of triangles, rhombuses and combinations thereof at an angle between 10 sexagesimal degrees and 40 sexagesimal degrees with respect to the generatrix or longitudinal axis of the tubular profile.

16. A repair kit for breaks to at least one of the three beam sections of the modular spraying boom support of claim 1, comprising a tube comprising a body of substantially the same tubular profile as a section of at least one of the three beam sections, and two tubular ends configured to be encased inside the tubular profile of the section of at least one of the three beam sections.

17. The modular spraying boom support of claim 1, wherein each of the articulated arms further comprises a support base made of a metallic material and/or a composite material fixed to the main beam section.

18. The modular spraying boom support of claim 17, wherein each of the articulated arms further comprises a pillar made of the metallic material and/or the composite material fixed to the support base and configured to distribute forces of the rope stabilization tensioners.

* * * * *